US009955138B2

(12) United States Patent
Tokunaga

(10) Patent No.: US 9,955,138 B2
(45) Date of Patent: Apr. 24, 2018

(54) INFORMATION PROCESSING APPARATUS, INFORMATION PROCESSING METHOD AND PROGRAM

(75) Inventor: Ryuji Tokunaga, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 288 days.

(21) Appl. No.: 13/137,879

(22) Filed: Sep. 20, 2011

(65) Prior Publication Data

US 2012/0133643 A1    May 31, 2012

(30) Foreign Application Priority Data

Nov. 29, 2010 (JP) .................................. 2010-264892

(51) Int. Cl.
H04N 13/00 (2006.01)
G06K 9/00 (2006.01)
H04N 13/04 (2006.01)

(52) U.S. Cl.
CPC ..... *H04N 13/0033* (2013.01); *H04N 13/0007* (2013.01); *H04N 13/007* (2013.01); *H04N 13/0022* (2013.01); *H04N 13/0468* (2013.01); *H04N 13/0472* (2013.01); *H04N 13/0452* (2013.01); *H04N 13/0475* (2013.01)

(58) Field of Classification Search
CPC ........ H04N 13/04; H04N 13/00; H04N 15/00; H04N 7/00; G09G 5/00; G06K 9/00; G02B 27/00
See application file for complete search history.

(56) References Cited

U.S. PATENT DOCUMENTS

| 2003/0086686 A1* | 5/2003 | Matsui ................ G11B 27/034 386/281 |
| 2003/0107643 A1* | 6/2003 | Yoon .............................. 348/47 |
| 2006/0038880 A1* | 2/2006 | Starkweather et al. ........ 348/51 |
| 2009/0096863 A1* | 4/2009 | Kim et al. ...................... 348/42 |
| 2010/0007582 A1* | 1/2010 | Zalewski ......................... 345/8 |

(Continued)

FOREIGN PATENT DOCUMENTS

| JP | 09-322198 | 12/1997 |
| JP | 2004-333661 A | 11/2004 |

(Continued)

OTHER PUBLICATIONS

Japanese Notice of Allowance issued in Application No. 2010-264892, dated Jan. 20, 2015 (2 pages).

(Continued)

*Primary Examiner* — Behrooz Senfi
*Assistant Examiner* — Maryam Nasri
(74) *Attorney, Agent, or Firm* — Oblon, McClelland, Maier & Neustadt, L.L.P.

(57) ABSTRACT

Disclosed herein is an information processing apparatus, including: a displaying controlling section adapted to control a display section to display a stereoscopic image based on stereoscopic image information; a detection section adapted to detect a change of the eyeballs of a user when the stereoscopic image is displayed on the display section; and a correction section adapted to correct the position of a material body included in the stereoscopic image in the depthwise direction based on the detected change of the eyeballs.

17 Claims, 29 Drawing Sheets

EXAMPLE OF CORRECTION DETERMINATION
(EXAMPLE WHEN CORRECTION IS REQUIRED)

(56) References Cited

U.S. PATENT DOCUMENTS

2010/0303442 A1* 12/2010 Newton ............ H04N 13/0033
                                                    386/241
2011/0080948 A1*  4/2011 Chen et al. .............. 375/240.12
2012/0133748 A1*  5/2012 Chung ............... H04N 13/0022
                                                     348/51

FOREIGN PATENT DOCUMENTS

| | | |
|---|---|---|
| JP | 2004-357760 A | 12/2004 |
| JP | 2005-110121 A | 4/2005 |
| JP | 2006-270924 A | 10/2006 |
| JP | 2010-258872 A | 11/2010 |
| JP | 2012-022150 A | 2/2012 |

OTHER PUBLICATIONS

Japanese Office Action issued in Application No. 2010-264892, dated Oct. 21, 2014 (3 pages).
Japanese Office Action issued in Application No. 2010-264892, dated Apr. 8, 2014 (4 pages).

* cited by examiner

FIG.7A
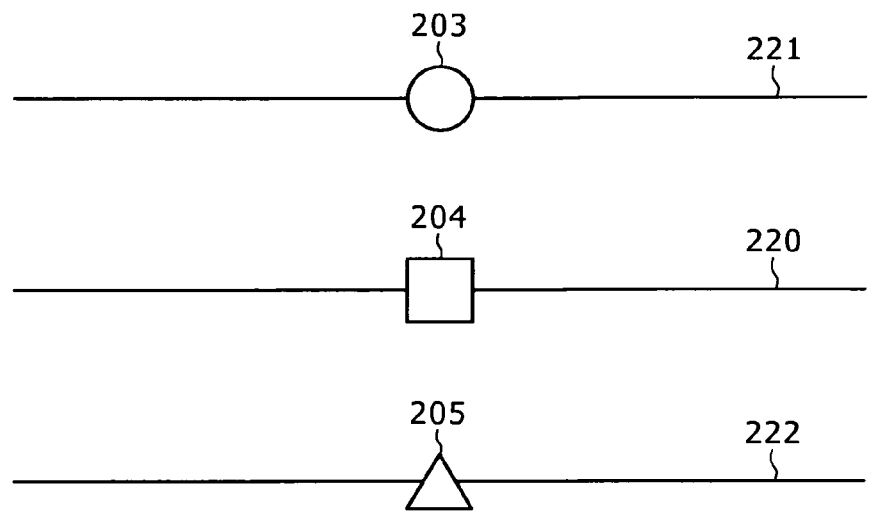
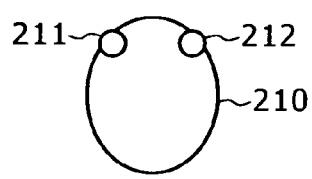
FIG.7B
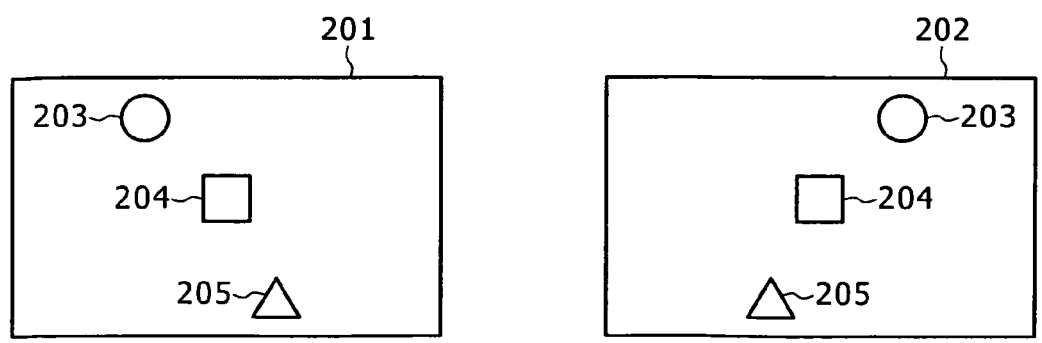

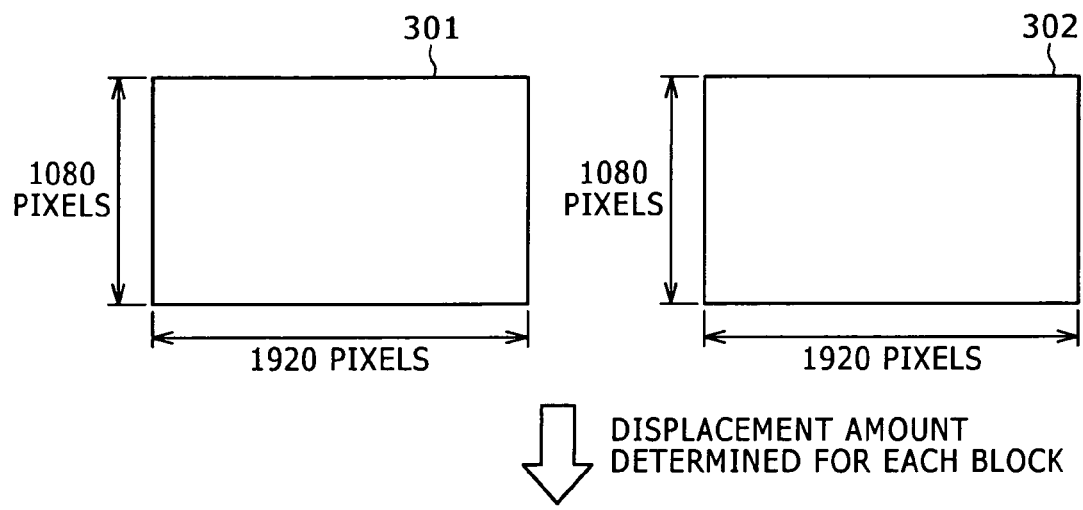

FIG.12A
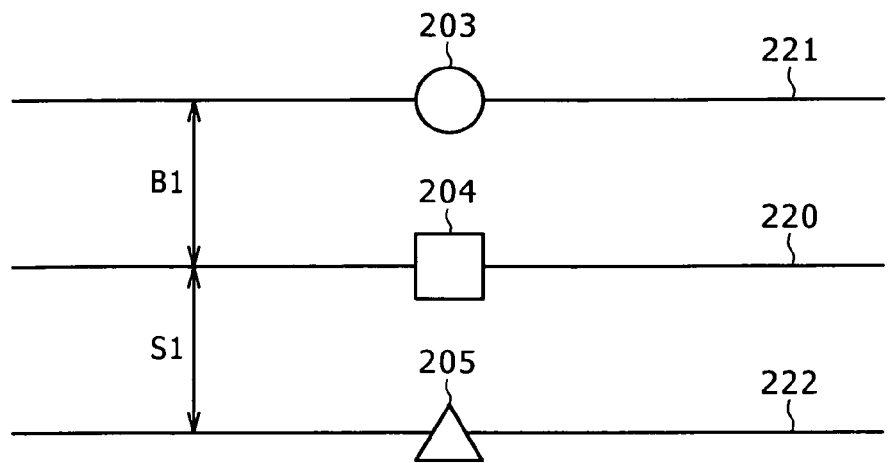
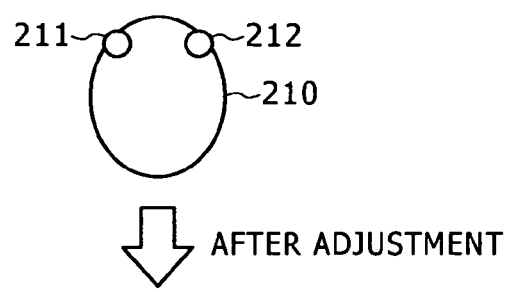
⇩ AFTER ADJUSTMENT
FIG.12B
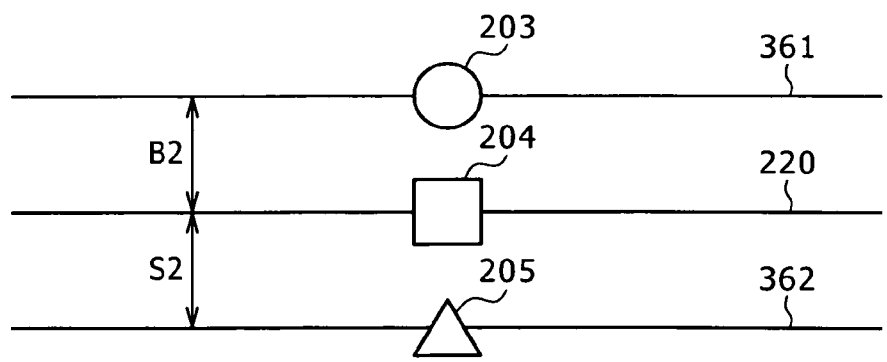
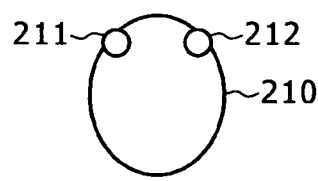

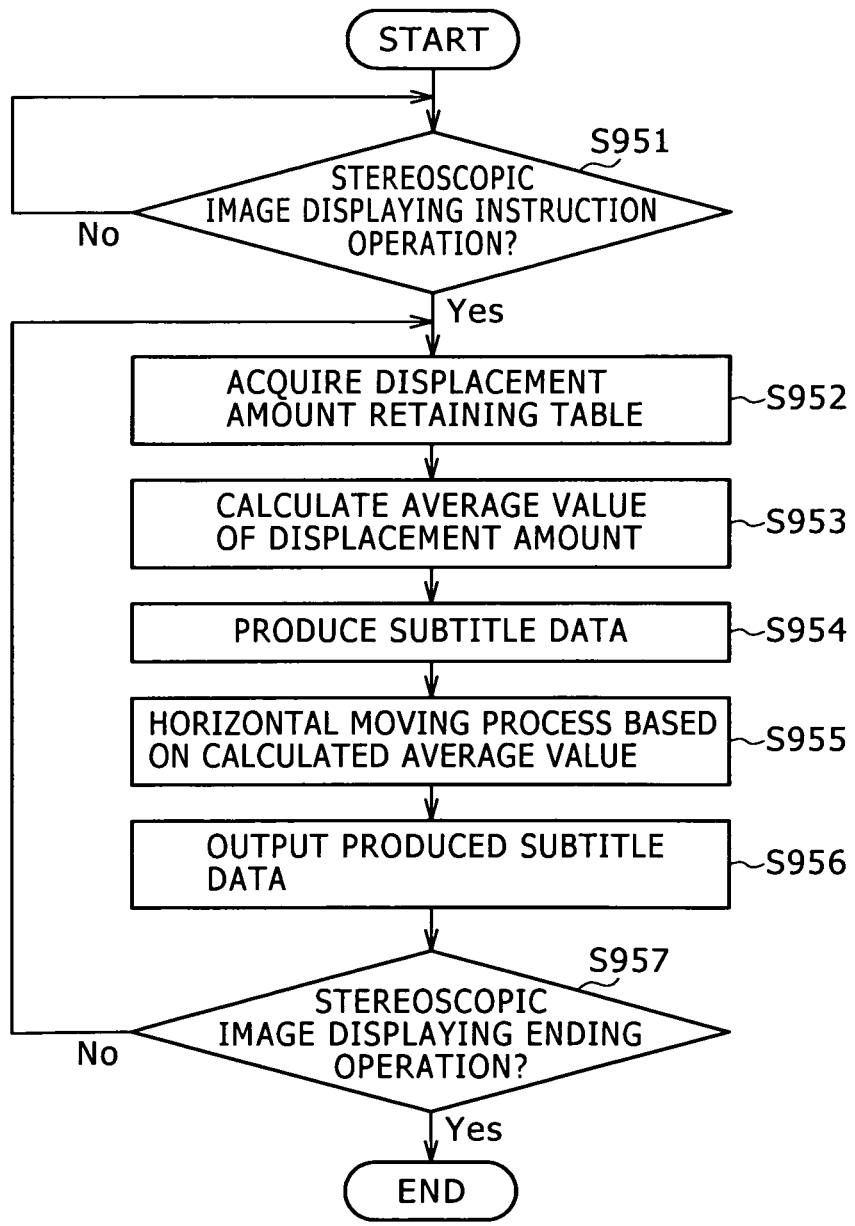

EXAMPLE OF ADJUSTMENT OF DEPTHWISE
AMOUNT UPON CM CHANGEOVER

EXAMPLE OF ADJUSTMENT OF DEPTHWISE
AMOUNT UPON CHANNEL CHANGEOVER

EXAMPLE OF ADJUSTMENT OF DEPTHWISE
AMOUNT UPON DOUBLE SPEED REPRODUCTION

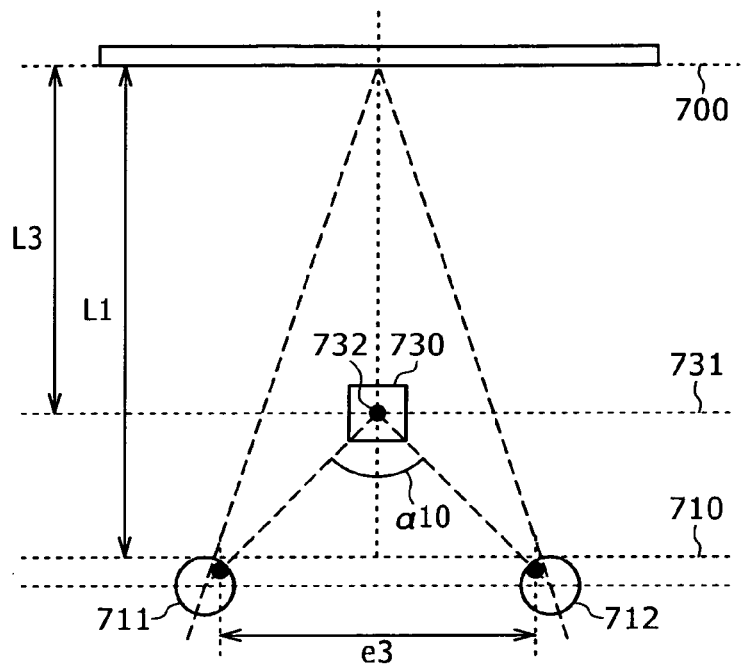

EXAMPLE OF CORRECTION DETERMINATION
(EXAMPLE WHEN CORRECTION IS NOT REQUIRED)

EXAMPLE OF CORRECTION DETERMINATION
(EXAMPLE WHEN CORRECTION IS REQUIRED)

INFORMATION PROCESSING APPARATUS, INFORMATION PROCESSING METHOD AND PROGRAM

BACKGROUND

This disclosure relates to an information processing apparatus, and more particularly to an information processing apparatus and an information processing method which handle information for displaying a stereoscopic image and a program for causing a computer to execute the method.

A large number of stereoscopic image displaying methods for displaying a stereoscopic image or 3D (three dimensional) image such as, for example, a two-viewpoint image formed from a left eye image and a right eye image from which a stereoscopic effect can be obtained making use of a parallax between the left and right eyes have been proposed. Further, in recent years, thanks to improvement in quality of stereoscopic image contents or 3D contents utilizing a computer, a stereoscopic image is displayed frequently in theaters and so forth, and the interest of viewers is increasing.

Further, together with digitalization of television broadcasting, an amount of digital data which cannot be transmitted by analog broadcasting in the past can be transmitted. Therefore, it is estimated that, by digital broadcasting in the future, digital data for displaying a stereoscopic image are transmitted to television sets for home use such that a stereoscopic image is displayed on a television set for home use in increasing opportunities. Therefore, it is estimated that the interest in a stereoscopic image further increases.

For example, as an apparatus for displaying a stereoscopic image, a stereoscopic video displaying television apparatus on which the user can observe a video having a stereoscopic effect shutter eyeglasses worn thereby has been proposed as disclosed in Japanese Patent Laid-Open No. Hei 9-322198.

SUMMARY

With the stereoscopic video displaying television apparatus, a stereoscopic image can be displayed appropriately.

Here, when the user is observing a stereoscopic image, a material body of an object of the display can be observed stereoscopically. In this instance, since the position of the image which the user actually observed, that is, the position on the display face, and the position of the material body at which the user looks by illusion are different from each other, it is supposed that the user may have a discomfort feeling. Further, since the position of the image which the user actually observed and the position of the material body at which the user looks by illusion are different from each other, a contradiction with a physiological phenomenon which can really occur generates. Therefore, it is significant to prevent such a contradiction as just described from making a cause of fatigue of the eyes of the user.

Therefore, it is desirable to provide an information processing apparatus, an information processing method and a program by which, when a stereoscopic image is displayed, the burden on the eyes of the user can be reduced.

According to an embodiment of the disclosed technology, there is provided an information processing apparatus, an information processing method, and a program for causing a computer to execute the method. The information processing apparatus includes a displaying controlling section adapted to control a display section to display a stereoscopic image based on stereoscopic image information, a detection section adapted to detect a change of the eyeballs of a user when the stereoscopic image is displayed on the display section, and a correction section adapted to correct the position of a material body included in the stereoscopic image in the depthwise direction based on the detected change of the eyeballs. In the information processing apparatus, a change of the eyeballs of a user when a stereoscopic image is displayed on the display section is detected, and the position of the material body included in the stereoscopic image in the depthwise direction is corrected based on the detected change of the eyeballs.

Also, the correction section may determine based on the detected change of the eyeballs whether or not the convergence angle of the user corresponding to the material body is greater than a fixed reference angle and carry out the correction such that, when the convergence angle is greater than the fixed reference angle, the position of the material body included in the stereoscopic image in the depthwise direction is moved toward the display face side of the stereoscopic image. In the information processing apparatus, it is determined whether or not the convergence angle of the user corresponding to the material body is greater than the fixed reference angle. Then, the correction is carried out such that, when the convergence angle is greater than the fixed reference angle, the position of the material body included in the stereoscopic image in the depthwise direction is moved toward the display face side of the stereoscopic image.

Further, the correction section may carry out the correction such that, when the change of the eyeballs of the user is greater than a fixed reference amount, the position of the material body included in the stereoscopic image in the depthwise direction is moved toward the display face side of the stereoscopic image. In the information processing apparatus, the correction is carried out such that, when the change of the eyeballs of the user is greater than the fixed reference amount, the position of the material body included in the stereoscopic image in the depthwise direction is moved toward the display face side.

Also, according to the embodiment of the present disclosure, the information processing apparatus may be configured such that it further includes an iris detection section adapted to detect the irises of the user when the stereoscopic image is displayed on the display section, and that the detection section detects a change of the eyeballs based on the distance between the detected irises. In the information processing apparatus, the irises of the user are detected, and a change of the eyeballs is detected based on the distance between the detected irises.

Further, according to the embodiment of the present disclosure, the detection section may determine the distance between the irises detected at a predetermined timing as a reference iris distance and successively compare the reference iris distance with distances between the irises detected later than the predetermined timing and then detect the change of the eyeballs based on a result of the comparison. In the information processing apparatus, the reference iris distance is successively compared with the distances between the irises detected later than the predetermined timing, and the change of the eyeballs is detected based on a result of the comparison.

In this instance, the predetermined timing may be a timing at which an instruction operation for the instruction to display the stereoscopic image based on the stereoscopic image information is carried out. In the information processing apparatus, the distance between the irises detected at the timing at which the instruction operation is carried out is determined as the reference iris distance.

In this instance, the information processing apparatus may be configured such that the displaying controlling section controls, when the instruction operation is carried out, the display section to display a reference stereoscopic image including a reference material body for measuring the reference iris distance, and the correction section determines that the distance between the irises of the user when the reference stereoscopic image is displayed on the display section is the reference iris distance and carries out the correction based on a result of comparison between a reference convergence angle which is a convergence angle of the user corresponding to the reference material body calculated based on the reference iris distance and a convergence angle of the user which corresponds to the material body included in the stereoscopic image displayed on the display section and is calculated based on the distance between the irises detected after the reference stereoscopic image is displayed. In the information processing apparatus, the correction is carried out based on a result of the comparison between the reference convergence angle calculated based on the reference iris distance and the convergence angle calculated based on the distance between the irises detected after the reference stereoscopic image is displayed.

Also, according to the embodiment of the present disclosure, the information processing apparatus may be configured such that the stereoscopic image information includes a parameter indicative of a position of a material body included in the stereoscopic image in the depthwise direction, and the correction section carries out the correction by adjusting the parameter. In the information processing apparatus, the correction is carried out by adjusting the parameter indicative of the position of the material body included in the stereoscopic image in the depthwise direction.

According to another embodiment of the disclosed technology, there is provided an information processing apparatus, an information processing method, and a program for causing a computer to execute the method. The information processing apparatus includes including an operation acceptance section adapted to accept an instruction operation for the instruction to carry out multiple speed reproduction of a stereoscopic image, a correction section adapted to correct, when the instruction operation is accepted, the position of a material body included in the stereoscopic image in the depthwise direction such that a change of the position remains within a fixed range, and an outputting controlling section adapted to output the stereoscopic image in which the position of the material body in the depthwise direction is corrected. In the information processing apparatus, if the instruction operation for the instruction to carry out multiple speed reproduction of a stereoscopic image is accepted, then the position of a material body included in the stereoscopic image in the depthwise direction is corrected such that a change of the position remains within the fixed range. Then, the stereoscopic image in which the position of the material body in the depthwise direction is corrected is outputted.

In summary, the information processing apparatus of the disclosed technique can achieve a superior effect that, when a stereoscopic image is displayed, the burden on the eyes of the user can be reduced.

BRIEF DESCRIPTION OF THE DRAWINGS

FIGS. 7A and 7B are schematic views illustrating a relationship between images which configure a stereoscopic image displayed on a display section shown in FIG. 2 and positions of material bodies included in the images in a depthwise direction;

FIGS. 9A and 9B are views schematically illustrating a stereoscopic image parameter stored in a content accompanying information storage section shown in FIG. 2;

FIGS. 12A and 12B are views schematically illustrating positions of a stereoscopic material body before and after correction, respectively, by the stereoscopic image correction section shown in FIG. 2;

FIG. 16 is a flow chart illustrating an example of a processing procedure of a subtitle production process by the subtitle production section shown in FIG. 2;

FIG. 27A is a diagrammatic view illustrating a measurement method when reference iris information retained in a reference iris information retention section shown in FIG. 23 is acquired and FIG. 27B is a view schematically illustrating the retained substance of the reference iris retention section;

DETAILED DESCRIPTION OF THE PREFERRED EMBODIMENTS

In the following, preferred embodiments of the technology disclosed herein are described with reference to the accompanying drawings. It is to be noted that the description is given in the following order.

1. First Embodiment (stereoscopic image output control: example wherein a stereoscopic image and sound information are corrected using a stereoscopic image parameter)

2. Second Embodiment (stereoscopic image output control: example wherein the position of a stereoscopic material body is corrected based on a variation of the eyeballs)

<1. First Embodiment>

Example of Use of the Information Processing Apparatus

Figure 1A:
FIGS. 1A and 1B are schematic views illustrating, in a simplified form, different examples of use of an information processing apparatus to which the disclosed technology is applied.
Figure 1B:

FIGS. 1A and 1B illustrate different examples of use of an information processing apparatus, to which the disclosed technology is applied, in a simplified form.

In particular, FIG. 1A illustrates a state in which a user or viewer 10 seated on a chair 11 looks at an image displayed on a display section 181 of an information processing apparatus 100. FIG. 1B illustrates another state in which the user 10 seated on the chair 11 looks at an image displayed on a display section 181 of an information processing apparatus 600 on which an image pickup section 610 is provided. The user 10 shown in FIGS. 1A and 1B can use a remote controller 500 held by a hand thereof to carry out various operations of the information processing apparatus 100 or 600. It is to be noted that the information processing apparatus 600 on which the image pickup section 610 is provided is hereinafter described in detail in connection with a second embodiment of the disclosed technology.

Example of the Configuration of the Information Processing Apparatus

Figure 2:
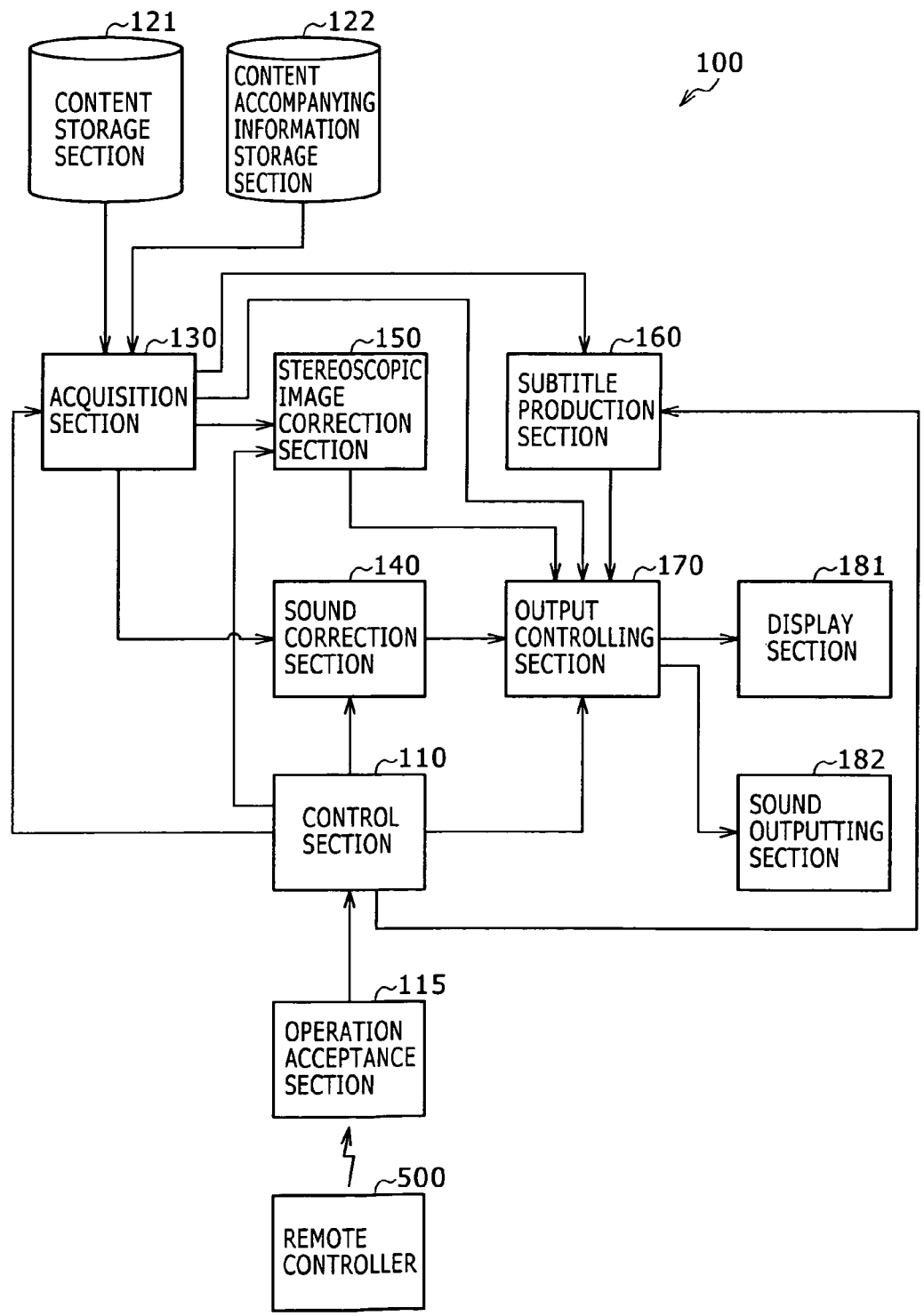
FIG. 2 is a block diagram showing an example of a functional configuration of an information processing apparatus according to a first embodiment of the disclosed technology.

FIG. 2 shows an example of a functional configuration of the information processing apparatus 100 according to the first embodiment of the disclosed technology. Referring to FIG. 2, the information processing apparatus 100 is implemented, for example, by a television receiver which receives broadcasting waves from broadcasting stations and displays an image, which may be a stereoscopic image or a planar image, or a television receiver having a recording function.

The information processing apparatus 100 includes a control section 110, an operation acceptance section 115, a content storage section 121, a content accompanying information storage section 122, an acquisition section 130, a sound correction section 140, a stereoscopic image correction section 150, and a subtitle production section 160. The information processing apparatus 100 further includes an output controlling section 170, a display section 181, a sound outputting section 182, and a remote controller 500. It is to be noted that, in regard to the first embodiment of the disclosed technology, illustration and description of a broadcast reception section for receiving broadcasting waves from the broadcasting stations through an antenna, a video decoding section for decoding a video signal, an audio decoding section for decoding an audio signal and so forth are omitted herein to facilitate illustration and description. Further, in the first embodiment of the disclosed technology, it is assumed in order to simplify description that a content, that is, image data or video data and audio data, received by the broadcast reception section and decoded by the video decoding section and the audio decoding section is stored and then displayed.

The control section 110 controls the components of the information processing apparatus 100 in response to an operation input accepted by the operation acceptance section 115. For example, if a displaying instruction operation for displaying a stereoscopic image is accepted, then the control section 110 carries out control for causing a stereoscopic image content according the displaying instruction operation to be outputted from the display section 181 and the sound outputting section 182. On the other hand, if, for example, a correcting instruction operation for correcting a stereoscopic image is accepted, then the control section 110 carries out control for causing an image correction process to be carried out in response to the correcting instruction operation. Further, for example, if a correction instruction operation for correcting sound of a stereoscopic image is accepted, then the control section 110 carries out control for carrying out a sound correction process in response to the correcting instruction operation.

The operation acceptance section 115 is an operation acceptance section for accepting an operation input by the user and supplies an operation signal in response to the accepted operation input to the control section 110. The operation acceptance section 115 corresponds, for example, to an operation member for switching on/off the power supply. Further, if the operation acceptance section 115 accepts an operation signal from the remote controller 500, then it supplies the accepted operation signal to the control section 110.

The content storage section 121 is used to store various contents and supplies a stored content to the acquisition section 130. For example, the content storage section 121 stores a content, that is, image data and sound data, corresponding to a broadcasting wave received by the broadcast reception section. Further, for example, the content storage section 121 stores a content for displaying a stereoscopic image, that is, a stereoscopic image content or stereoscopic image information.

The content accompanying information storage section 122 is a storage section for storing accompanying information relating to contents stored in the content storage section 121 and supplies the stored accompanying information to the acquisition section 130. For example, the content accompanying information storage section 122 stores a displacement amount retention table relating to a stereoscopic image content stored in the content storage section 121 and binarized data in an associated relationship with each other as stereoscopic image parameters which are accompanying information. It is to be noted that the displacement amount retention table and the binarized data are hereinafter described with reference to FIGS. 9A and 9B. Further, a content which includes a stereoscopic image content and accompanying information relating to the stereoscopic image content may be used as a stereoscopic image content or stereoscopic image information.

The acquisition section 130 acquires various kinds of information stored in the content storage section 121 and the content accompanying information storage section 122 under the control of the control section 110 and supplies the acquired information to the components of the information processing apparatus 100. For example, if the acquisition section 130 acquires a stereoscopic image content from the content storage section 121, then it supplies image data from within the stereoscopic image content to the stereoscopic image correction section 150 and supplies sound data from within the stereoscopic image to the sound correction section 140. In this instance, the acquisition section 130 acquires a stereoscopic image parameter associated with the stereoscopic image content from the content accompanying information storage section 122 and supplies the stereoscopic image parameter to the stereoscopic image correction section 150, sound correction section 140 and subtitle production section 160.

The sound correction section 140 corrects sound data when a stereoscopic image content is outputted under the control of the control section 110 and outputs sound data after the correction to the output controlling section 170. In particular, the sound correction section 140 corrects sound data supplied thereto from the acquisition section 130 based on a position of a material body included in the stereoscopic image in the depthwise direction. For example, the sound correction section 140 uses the displacement amount retention table included in the stereoscopic image parameter such as, for example, a parameter representative of the position of a material body in the depthwise direction supplied from the acquisition section 130 to correct the sound data. For example, the sound correction section 140 calculates an average value of displacement amounts in the displacement amount retention table and corrects the sound data based on the calculated average value. In this instance, the sound correction section 140 corrects the sound data such that, for example, a sound image by the sound data is localized at a position of the material body in the depthwise direction, that is, at a position corresponding to the average value of the displacement amounts. For example, the sound correction section 140 uses a head related transfer function (HRTF) filter corresponding to the position to correct the sound data. It is to be noted that the head related transfer function filter is configured, for example, from a FIR (Finite Impulse Response) filter. Further, a functional configuration of the sound correction section 140 is hereinafter described in detail with reference to FIG. 3.

The stereoscopic image correction section 150 corrects image data when a stereoscopic image content is to be outputted under the control of the control section 110, and outputs image data after the correction to the output controlling section 170. In particular, the stereoscopic image correction section 150 corrects image data supplied from the acquisition section 130 in regard to the position of a material body included in the stereoscopic image in the depthwise direction. For example, the stereoscopic image correction section 150 uses a displacement amount retention table included in the stereoscopic image parameter supplied thereto from the acquisition section 130 to correct the image data. For example, the stereoscopic image correction section 150 adjusts the displacement amounts in the displacement amount retention table in response to a user operation to correct the image data. It is to be noted that a functional configuration of the stereoscopic image correction section 150 is hereinafter described in detail with reference to FIG. 4. Also, the stereoscopic image correction section 150 is an example of a correction section in the disclosed technique.

The subtitle production section 160 produces subtitle data when a stereoscopic image content is to be outputted under the control of the control section 110 and outputs the produced subtitle data to the output controlling section 170. In particular, the subtitle production section 160 produces subtitle data for displaying a subtitle as a stereoscopic image in accordance with an instruction from the control section 110. In this instance, the subtitle production section 160 corrects the position of the subtitle in the depthwise direction in accordance with the instruction from the control section 110. For example, the stereoscopic image correction section 150 uses a displacement amount retention table included in the stereoscopic image parameters supplied thereto from the acquisition section 130 to correct the subtitle data. For example, the subtitle production section 160 calculates an average value of the displacement amounts in the displacement amount retention table and corrects the subtitle data based on the calculated average value. It is to be noted that a functional configuration of the subtitle production section 160 is hereinafter described in detail with reference to FIG. 5.

The output controlling section 170 carries out an outputting process for outputting a content stored in the content storage section 121 in response to an operation input accepted by the operation acceptance section 115. For example, if a displaying instruction operation for displaying a stereoscopic image is accepted, then the output controlling section 170 controls the display section 181 and the sound outputting section 182 to output the stereoscopic image content associated with the displaying instruction operation. In this instance, the output controlling section 170 carries out a blending process of image data of a displaying object and the subtitle data produced by the subtitle production section 160 such that the stereoscopic image and the subtitle, which is a stereoscopic image, are displayed in a synthesized state. Further, for example, if a correction instruction operation for correcting a stereoscopic image is accepted, then the output controlling section 170 carries out an outputting operation using the sound data outputted from the sound correction section 140 and the image data outputted from the stereoscopic image correction section 150.

The display section 181 displays various images under the control of the output controlling section 170. The display section 181 can be implemented, for example, by a display device such as an LCD (Liquid Crystal Display) device.

The sound outputting section 182 outputs various kinds of sound information under the control of the output controlling section 170. The sound outputting section 182 can be implemented, for example, by a speaker.

The remote controller 500 is used for remote control from a place spaced away from the information processing apparatus 100 and outputs an operation signal or output signal in response to an operation input by the user to the operation acceptance section 115. For example, an infrared signal can be used as the output signal of the remote controller 500. An appearance configuration of the remote controller 500 is hereinafter described in detail with reference to FIG. 6.

Example of the Configuration of the Sound Correction Section

Figure 3:
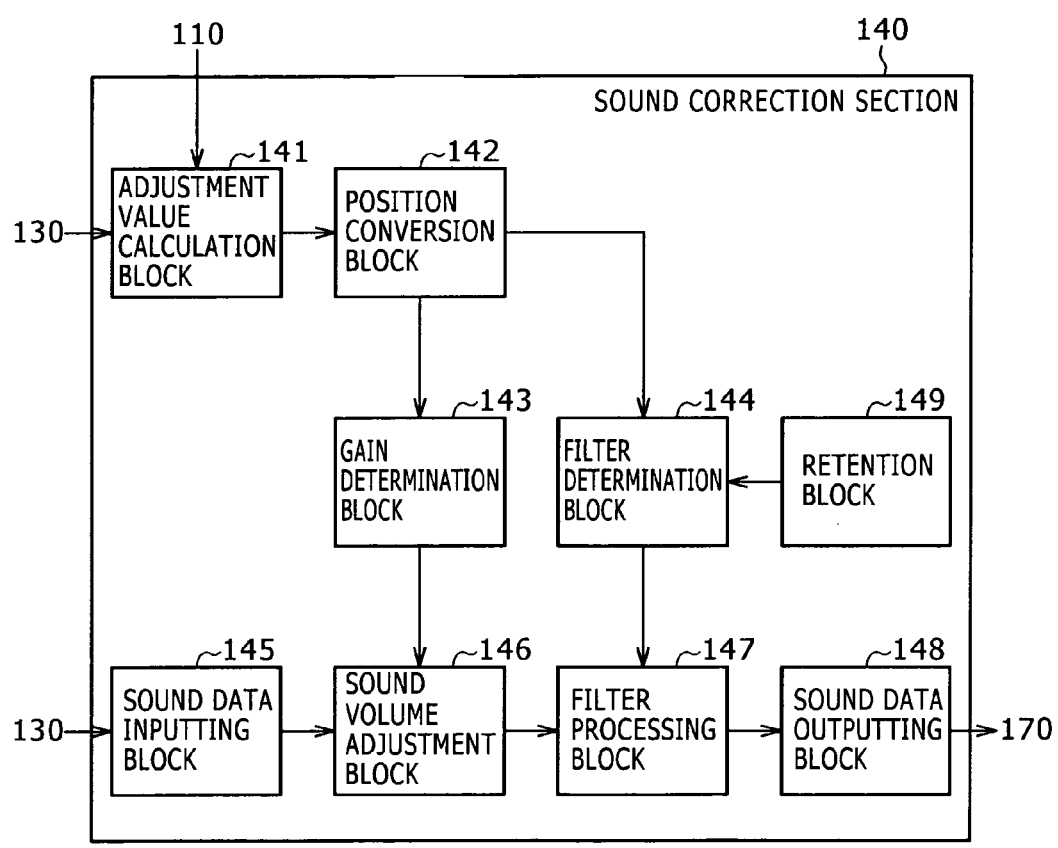
FIG. 3 is a block diagram showing an example of a functional configuration of a sound correction section shown in FIG. 2.

FIG. 3 shows an example of a functional configuration of the sound correction section 140 in the first embodiment of the disclosed technology.

Referring to FIG. 3, the sound correction section 140 includes an adjustment value calculation block 141, a position conversion block 142, a gain determination block 143, and a filter determination block 144. The sound correction section 140 further includes a sound data inputting block 145, a sound volume adjustment block 146, a filter processing block 147, a sound data outputting block 148 and a retention block 149.

The adjustment value calculation block 141 calculates an adjustment value for correcting sound data supplied from the acquisition section 130 under the control of the control section 110 and outputs the calculated adjustment value to the position conversion block 142. For example, the adjustment value calculation block 141 calculates an average value of displacement amounts in the displacement amount retention table included in the stereoscopic image parameter supplied thereto from the acquisition section 130 as an adjustment value.

The position conversion block 142 converts the adjustment value outputted from the adjustment value calculation block 141 into a position for correcting the sound data, that is, into a position in the depthwise direction. The position conversion block 142 outputs the position, that is, the position information, after the conversion to the gain determination block 143 and the filter determination block 144.

The gain determination block 143 determines a gain amount for carrying out sound volume adjustment based on the position information outputted from the position conversion block 142 and outputs the determined gain amount to the sound volume adjustment block 146. It is to be noted that, if no sound volume adjustment is required, then the gain determination block 143 outputs "1" as the gain amount to the sound volume adjustment block 146. Further, a determination method of the gain amount is hereinafter described in detail with reference to FIG. 13.

The filter determination block 144 determines, based on position information outputted from the position conversion block 142, a filter coefficient for localizing a sound image at a position corresponding to the position information, and outputs the determined filter coefficient to the filter processing block 147. The retention block 149 retains, for each plurality of positions, a plurality of head related transfer function filters individually corresponding to a plurality of positions in the depthwise direction. For example, the filter determination block 144 selects, from among a plurality of head related transfer function filters retained in the retention block 149, a head related transfer function filter corresponding to a position nearest to the position corresponding to the position information outputted from the position conversion block 142. Then, the filter determination block 144 outputs the filter coefficient of the selected head related transfer function filter to the filter processing block 147. It is to be noted that a determination method of the filter coefficient is hereinafter described in detail with reference to FIG. 13.

The sound data inputting block 145 receives sound data supplied thereto from the acquisition section 130 and supplies the sound data to the sound volume adjustment block 146.

The sound volume adjustment block 146 carries out sound volume adjustment regarding the sound data supplied thereto from the sound data inputting block 145 using the gain amount outputted from the gain determination block 143, and outputs the sound data after the sound volume adjustment to the filter processing block 147. It is to be noted that a sound volume adjustment method is hereinafter described in detail with reference to FIG. 13.

The filter processing block 147 carries out a filtering process for the sound data supplied thereto from the sound data inputting block 145 using the filter coefficient outputted from the filter determination block 144, and outputs the sound data after the filtering process to the sound data outputting block 148. For example, the filter processing block 147 uses a head related transfer function filter having the filter coefficient outputted from the filter determination block 144 to carry out a filtering process for localizing a sound image at the position obtained by the conversion by the position conversion block 142. This filtering process is, for example, a binarizing process by a head related transfer function filter and a process of convoluting a head related transfer function into sound data or a sound signal. It is to be noted that a filtering processing method is hereinafter described in detail with reference to FIG. 13.

The sound data outputting block 148 outputs the sound data after the filtering process outputted from the filter processing block 147 to the output controlling section 170.

[Configuration Example of the Stereoscopic Image Correction Section]

Figure 4:
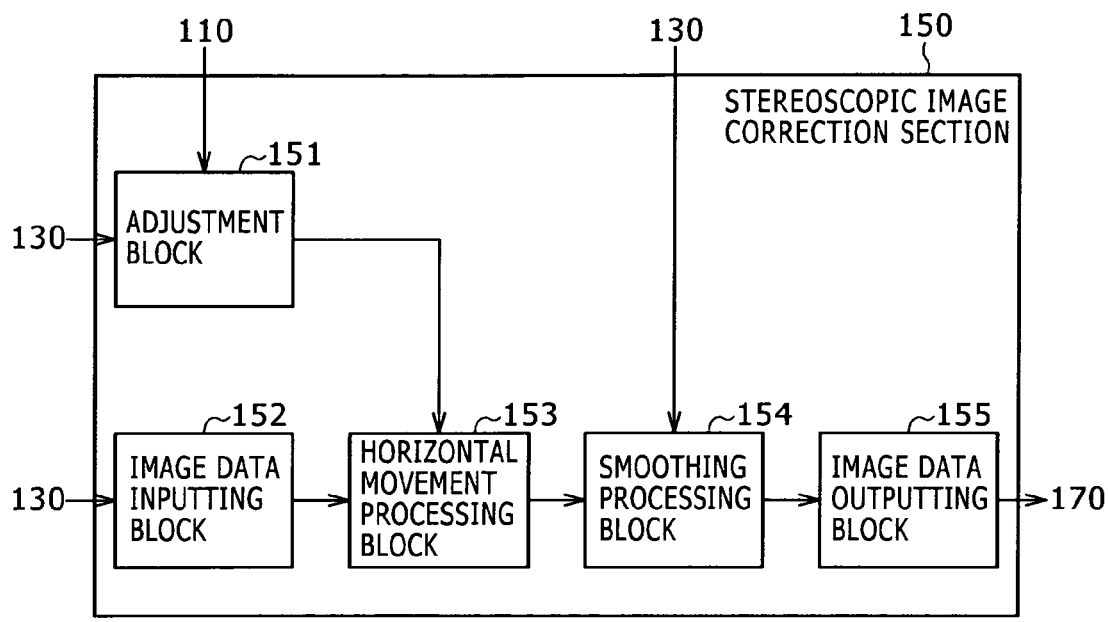
FIG. 4 is a block diagram showing an example of a functional configuration of a stereoscopic image correction section shown in FIG. 2.

FIG. 4 shows an example of a functional configuration of the stereoscopic image correction section 150 in the first embodiment of the disclosed technology.

Referring to FIG. 4, the stereoscopic image correction section 150 includes an adjustment block 141, an image data inputting block 152, a horizontal movement processing block 153, a smoothing processing block 154 and an image data outputting block 155.

Figure 6:
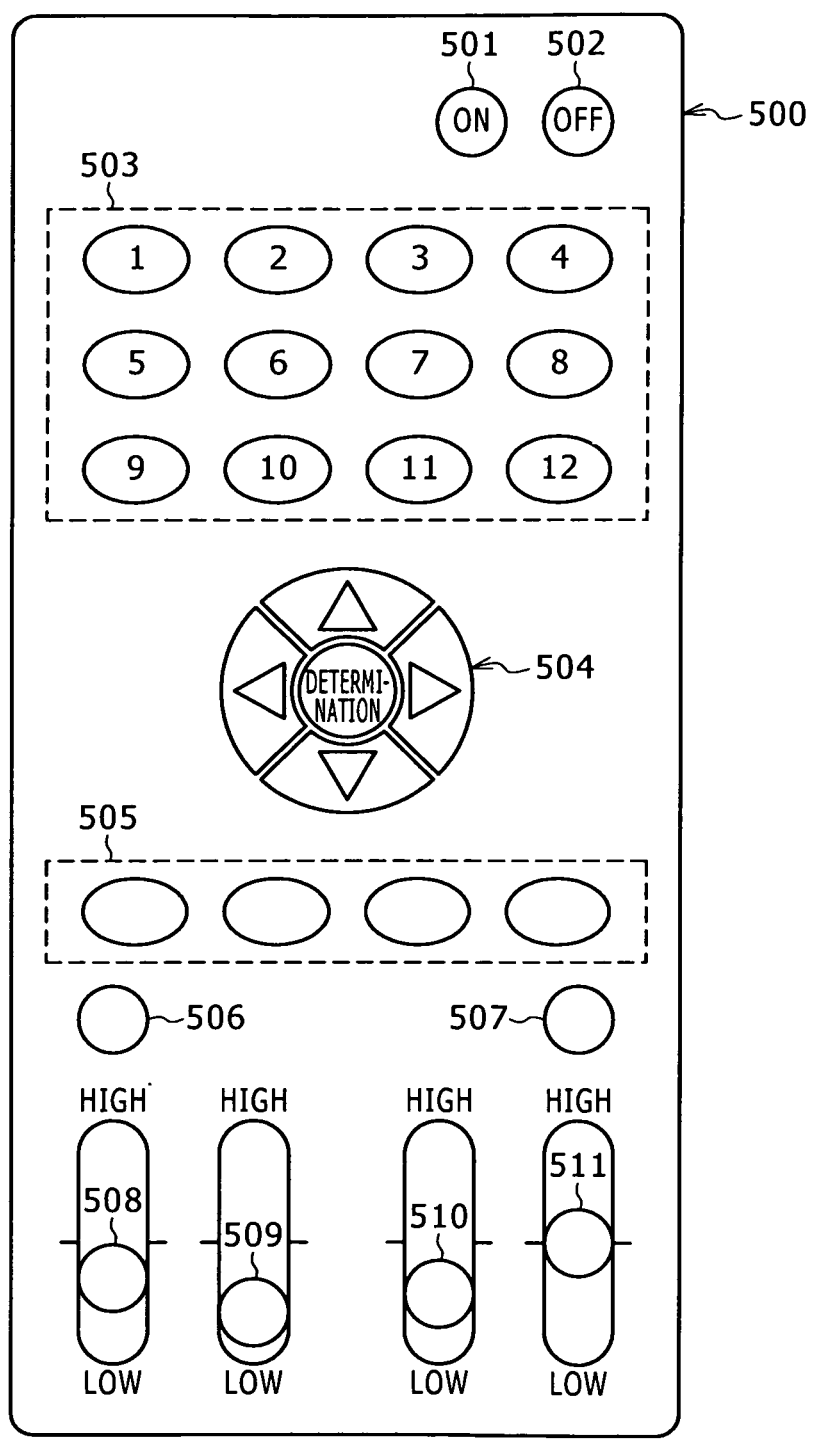
FIG. 6 is a schematic view showing an example of an appearance configuration of a remote controller shown in FIG. 2.

The adjustment block 151 adjusts a parameter for correcting image data supplied thereto from the acquisition section 130 under the control of the control section 110 and outputs the parameter after the adjustment to the horizontal movement processing block 153. For example, the adjustment block 151 adjusts the displacement amounts in the displacement amount retention table included in the stereoscopic image parameter supplied thereto from the acquisition section 130 in response to an operation input accepted by the operation acceptance section 115 and outputs the displacement amounts after the adjustment to the horizontal movement processing block 153. It is to be noted that, for an operation input for adjusting a parameter, for example, a depthwise position adjustment lever 510 for a stereoscopic image shown in FIG. 6 is used. By the operation input, it is possible to display a stereoscopic image re-adjusted to a position, that is, to a position in the depthwise direction, desired by the user.

The image data inputting block 152 receives image data supplied as input data thereto from the acquisition section 130 and supplies the received image data to the horizontal movement processing block 153.

The horizontal movement processing block 153 carries out a moving process of an image of the image data supplied thereto from the image data inputting block 152 using the parameter after the adjustment outputted from the adjustment block 151 and outputs the image data after the process to the smoothing processing block 154. For example, the horizontal movement processing block 153 carries out a horizontally moving process of a left eye image from between a left eye image and a right eye image which configure a stereoscopic image corresponding to the image data supplied from the image data inputting block 152. In particular, the horizontal movement processing block 153 carries out a horizontally moving process of moving the pixels which configure the left eye image by the displacement amount after the adjustment by the adjustment block 151 to produce a new right eye image. This horizontally moving process is carried out, for example, in a unit of a block of a displacement amount retention table 300 illustrated in FIG. 9B. Then, the horizontal movement processing block 153 outputs image data corresponding to the left eye image which configures the stereoscopic image and the newly produced right eye image to the smoothing processing block 154. It is to be noted that, while, in the present example, the displacement amount after the adjustment by the adjustment block 151 is used to produce a new right eye image, alternatively the displacement amount after the adjustment by the adjustment block 151 may be used to carry out a horizontally moving process for the original right eye image to produce a stereoscopic image.

The smoothing processing block 154 carries out a filtering process of an edge portion of a region of a stereoscopic material body, that is, a smoothing process by a moving average filter, with regard to the image data outputted from the horizontal movement processing block 153. The smoothing processing block 154 outputs the image data after the process to the image data outputting block 155. For example, the smoothing processing block 154 determines a region of a stereoscopic material body and any other region using the binarized data included in the stereoscopic image parameter supplied thereto from the acquisition section 130. Then, the smoothing processing block 154 carries out a smoothing process by a moving average filter for a region determined as the region of the stereoscopic material body. By this smoothing process, a perspective can be provided to a region of a stereoscopic material body or 3D object located remotely.

The image data outputting block 155 outputs the image data after the image processes outputted from the smoothing processing block 154 to the output controlling section 170.

Example of the Configuration of the Subtitle Data Correction Section

Figure 5:
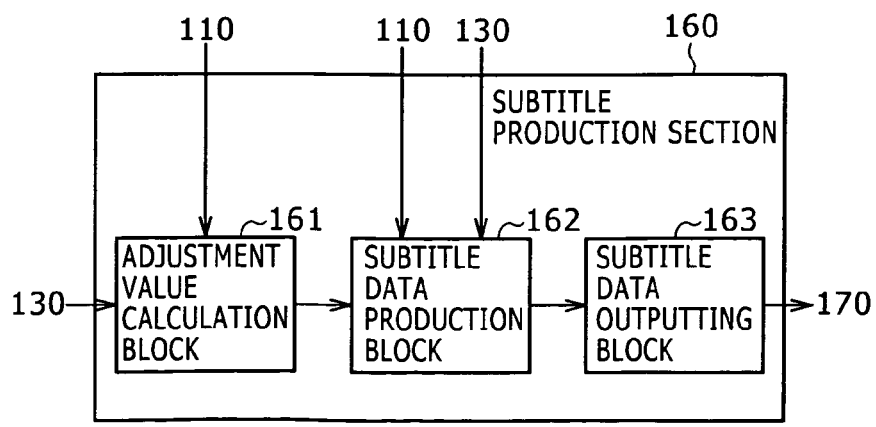
FIG. 5 is a block diagram showing an example of a functional configuration of a subtitle production section shown in FIG. 2.

FIG. 5 shows an example of a functional configuration of the subtitle production section 160 in the first embodiment of the disclosed technology.

Referring to FIG. 5, the subtitle production section 160 includes an adjustment value calculation block 161, a subtitle data production block 162 and a subtitle data outputting block 163.

The adjustment value calculation block 161 calculates an adjustment value for determining the position, that is, the position in the depthwise direction, of a subtitle to be displayed on the display section 181 under the control of the control section 110. The adjustment value calculation block 161 outputs the calculated adjustment value to the subtitle data production block 162. For example, the adjustment value calculation block 161 calculates an average value of the displacement amounts in the displacement amount retention table included in the stereoscopic image parameter supplied thereto from the acquisition section 130 as an adjustment value.

The subtitle data production block 162 produces subtitle data to be displayed on the display section 181 under the control of the control section 110 and outputs the produced subtitle data to the subtitle data outputting block 163. For example, the subtitle data production block 162 can produce subtitle data using a content, that is, a subtitle content, stored in the content storage section 121. In this instance, the subtitle data production block 162 carries out a horizontally moving process of an image of the subtitle data or subtitle image produced thereby using the adjustment value outputted from the adjustment value calculation block 161. Then, the subtitle data production block 162 outputs the subtitle data after the process to the subtitle data outputting block 163. It is to be noted that the horizontally moving process in this instance is same as the horizontally moving process by the horizontal movement processing block 153 shown in FIG. 4, and therefore, overlapping description of the process is omitted herein.

The subtitle data outputting block 163 outputs subtitle data outputted from the subtitle data production block 162 to the output controlling section 170.

In this manner, according to the first embodiment of the disclosed technology, an appropriate stereoscopic subtitle in accordance with a stereoscopic image displayed on the display section 181 can be provided to the user. Consequently, the user can have a further abundant presence.

Example of the Configuration of the Remote Controller

FIG. 6 shows an example of an appearance configuration of the remote controller 500 in the first embodiment of the disclosed technology.

Referring to FIG. 6, the remote controller 500 has power supply buttons 501 and 502, a channel designation button group 503, an arrow mark determination button group 504, a function selection button group 505, and a reference iris information acquisition button 506 provided thereon. The remote controller 500 further has a stereoscopic image correction changeover button 507, a volume adjustment lever 508, a channel selection lever 509, a depthwise position adjustment lever 510 for a stereoscopic image and a sound position adjustment lever 511 for a stereoscopic image provided thereon.

The power supply buttons 501 and 502 are used to switch on and off the power supply to the information processing apparatus 100, respectively.

The channel designation button group 503 is used to designate a broadcast channel when a broadcasting program, which may be for a stereoscopic image or a plane image, based on a broadcasting wave using the information processing apparatus 100.

The arrow mark determination button group 504 includes upward, downward, leftward and rightward arrow mark buttons and a determination button which are used when a menu screen or the like is displayed on the display section 181. The upward, downward, leftward and rightward arrow mark buttons are used when a selection operation for selecting upward, downward, leftward and rightward direction on a display screen image displayed on the display section 181. The upward, downward, leftward and rightward arrow mark buttons are used to move, for example, when a selection operation is to be carried out on a menu screen, the selection state upwardly, downwardly, leftwardly and rightwardly, respectively. The determination button is used to carry out various determination operations on a display screen image displayed on the display section 181 and is used, for example, to determine a selection state on a menu screen.

The function selection button group 505 includes buttons which are used to select various functions.

The reference iris information acquisition button 506 is depressed to acquire reference iris information regarding the user. It is to be noted that the reference iris information acquisition button 506 is hereinafter described in detail in the second embodiment of the disclosed technology.

The stereoscopic image correction changeover button 507 is depressed to carry out changeover between an automatic mode in which various corrections regarding a stereoscopic image are carried out automatically and a manual mode in which such various corrections are carried out manually.

The volume adjustment lever 508 is used to adjust the sound volume of sound to be outputted from the sound outputting section 182.

The channel selection lever 509 is used to select a broadcast channel when a broadcasting program for a stereoscopic image or a plane image based on a broadcasting wave using the information processing apparatus 100.

The depthwise position adjustment lever 510 for a stereoscopic image is used to adjust, when a stereoscopic image is displayed on the display section 181, the position of a material body included in the stereoscopic image in the depthwise direction. It is to be noted that an example of adjustment using the depthwise position adjustment lever 510 for a stereoscopic image is hereinafter described in detail with reference to FIGS. 12A and 12B.

The sound position adjustment lever 511 for a stereoscopic image is used to adjust, when a stereoscopic image is displayed on the display section 181, the position, that is, the position in the depthwise direction, at which a sound image of sound relating to the stereoscopic image is to be localized.

Example of the Relationship between a Stereoscopic Image and the Position of a Material Body Included in a Stereoscopic Image in the Depthwise Direction FIGS. 7A and 7B illustrate a relationship between images which configure a stereoscopic image displayed on the display section 181 in the first embodiment of the disclosed technology and the position of a material body included in each of the images in the depthwise direction. More particularly, FIG. 7A schematically shows a top plan view in the case where the positions of material bodies 203 to 205 which the user 210 can view stereoscopically are disposed virtually in the depthwise direction, when a stereoscopic image is displayed on the display section 181. FIG. 7B shows a stereoscopic image, particularly a left eye image 201 and a right eye image 202, for displaying the material bodies 203 to 205 shown in FIG. 7A stereoscopically. In particular, the left and right eye images 201 and 202 include the material bodies 203 to 205. Further, the depthwise direction is a direction, for example, parallel to a line interconnecting the user 210 and the display face of the display section 181 and perpendicular to the display face of the display section 181.

It is to be noted that, in FIG. 7B, the same material body is denoted by the same reference character in both of the left eye image 201 and the right eye image 202. Further, in FIG. 7B, the displacement amount of the material bodies 203 to 205 included in the left eye image 201 and the right eye image 202 is shown in an exaggerated state to facilitate understandings.

Further, in the first example of the disclosed technology, a parallax barrier method or a special glasses method can be used as a displaying method for displaying a stereoscopic image on the display section 181. In the special glasses method, the user wears special eyeglasses for viewing a stereoscopic image such as active shutter type eyeglasses or polarizer type eyeglasses so that a stereoscopic image is provided to the user. It is to be noted that the embodiment of the disclosed technology can be applied also to any other method than the parallax barrier method and the special glasses method.

Here, a case is studied wherein, when the left eye image 201 and the right eye image 202 are displayed on the display section 181, the left eye 211 of the user 210 observes the left eye image 201 and the right eye 212 of the user 210 observes the right eye image 202. In this instance, it is assumed that the material body 204 included in the left eye image 201 and the right eye image 202 is observed at a position 220 of the display face, which is a position of the display face of the display section 181. Further, it is assumed that the material body 203 included in the left eye image 201 and the right eye image 202 is observed on the interior side of the position 220, that is, on the interior side 221 with respect to the display face, and the material body 205 is observed on this side of the position 220 of the display face, that is, on this side 222 with respect to the display face.

In this manner, in the case where the material body 204 at the position 220 on the display face is taken as a reference, the material bodies 203 and 205 which provide a stereoscopic effect are displaced in the horizontal direction in the stereoscopic image, that is, in the left eye image 201 and the right eye image 202. Further, in the case where the position 220 is taken as a reference, the displaced positions are reversed between the protruding material body 205 and the retracted material body 203.

Figure 8:
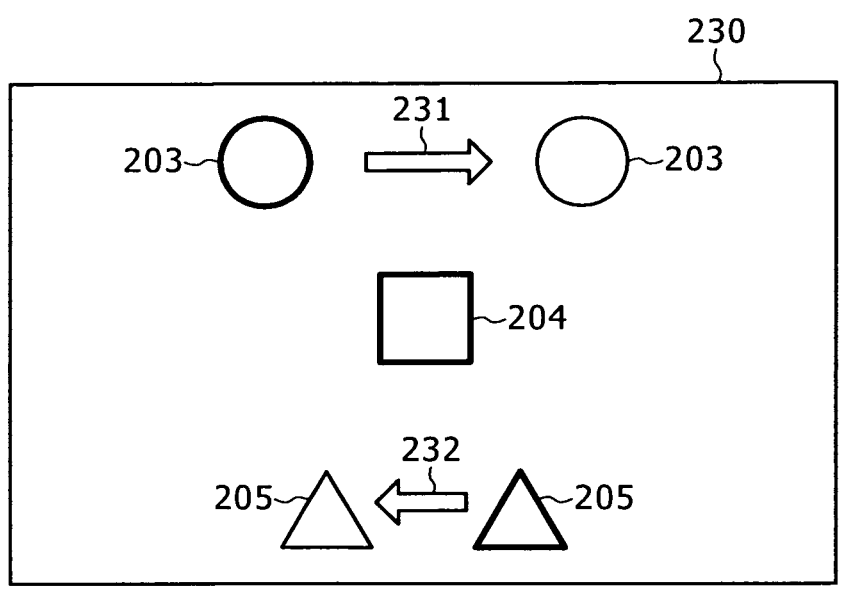
FIG. 8 is a schematic view illustrating a relationship between displacement amounts of material bodies included in images which configure a stereoscopic image displayed on the display section shown in FIG. 2.

Example of the Relationship of the Displacement Amounts of Material Bodies Included in the Left Eye Image and the Right Eye Image FIG. 8 illustrates a relationship between the displacement amounts of material bodies included in images which configure a stereoscopic image displayed on the display section 181 in the first embodiment of the disclosed technology. A rectangle 230 corresponds to the left eye image 201 and the right eye image 202 shown in FIG. 7B, and in the rectangle 230, the material bodies 203 to 205 included in the left eye image 201 and the right eye image 202 shown in FIG. 7B are shown. It is to be noted that, in the rectangle 230, the contour of the material bodies 203 to 205 included in the left eye image 201 shown FIG. 7B from among the material bodies 203 to 205 is indicated by a thick line. It is to be noted that no displacement occurs with the material body 204 because the material body 204 corresponds to the position 220 on the display face as seen in FIG. 7A. Therefore, in the rectangle 230, the material body 204 included in the left eye image 201 and the material body 204 included in the right eye image 202 overlap with each other.

Further, the displacement amount of the material body 203 between the left eye image 201 and the right eye image 202 in the case where the left eye image 201 is made a reference in the rectangle 230 is indicated by an arrow mark 231. Similarly, the displacement amount of the material body 205 between the left eye image 201 and the right eye image 202 in the case where the left eye image 201 is made a reference is indicated by another arrow mark 232. It is to be noted that no displacement occurs with the material body 204 as described above.

Since the parallax between the left and right eyes is utilized to obtain a stereoscopic vision, material bodies included in the left eye image 201 and the right eye image 202 are displaced from each other in response to the displayed position of the material bodies, that is, the position in the depthwise position. In other words, the displacement amount of displayed material bodies corresponds to the protruding amount or retracted amount of the stereoscopic material body or 3D object.

Therefore, in the first embodiment of the disclosed technology, the displacement amount of a material body relating to a left eye image and a right eye image which configure a stereoscopic image, that is, the protruding amount or retracting amount of a stereoscopic material body or 3D object, is used as a stereoscopic image parameter. Further, in the first embodiment of the disclosed technology, the left eye image is used as a reference, and a stereoscopic image parameter calculated based on the difference between a displayed material body included in the left eye image and a displayed material body included in the right eye image, that is, a protruding amount or retracted amount of the material body, is used.

For example, if a material body included in the left eye image which is used as a reference is displaced to the left side, which is the left side in FIG. 8, on the right eye image, then the material body is a protruding body. Then, the displacement amount of the material body is determined to be greater than 0, that is, displacement amount>0.

On the other hand, for example, if a material body included in the left eye image which is used as a reference is displaced to the right side, which is the right side in FIG. 8, on the right eye image, then the material body is a retracted body. Then, the displacement amount of the material body is determined to be smaller than 0, that is, displacement amount<0.

However, for example, if a material body included in the left eye image which is used as a reference is not displaced on the right eye image, then the material body is positioned at a position of the display face, that is, the screen face. Then, the displacement amount of the material body is determined to be equal to 0, that is, displacement amount=0.

In particular, since the material body 203 included in the left eye image 201 as a reference is displaced to the right side as indicated by the arrow mark 231 on the right eye image 202, the material body 203 is a retracted body and the displacement amount of the material body 203 is smaller than 0, that is, displacement amount of the material body 203<0.

On the other hand, since the material body 205 included in the left eye image 201 as a reference is displaced to the left side as indicated by the arrow mark 232 on the right eye image 202, the material body 205 is a protruding body and the displacement amount of the material body 205 is greater than 0, that is, displacement amount of the material body 205>0.

On the other hand, since the material body 204 included in the left eye image 201 as a reference is not displaced on the right eye image 202, the material body 204 is positioned at a position on the display face or screen face and the displacement amount of the material body 204 is 0, that is, displacement amount of the material body 204=0.

Example of the Displacement Amount Retention Table

FIGS. 9A and 9B schematically illustrate a stereoscopic image parameter, that is, the displacement amount retention table 300, stored in the content accompanying information storage section 122 in the first embodiment of the disclosed technology.

More particularly, FIG. 9A show a stereoscopic image, particularly, a left eye image 301 and a right eye image 302, used for production of the displacement amount retention table 300. Referring to FIG. 9A, the left eye image 301 and the right eye image 302 include 1,920×1,080 pixels. It is to be noted that, in FIG. 9A, rectangles corresponding to the left eye image 301 and the right eye image 302 are shown while material bodies and so forth included in the images are not shown.

Here, a calculation method of a displacement amount of a material body included in a stereoscopic image is described. For example, a left eye image is divided into regions or blocks of a particular size, and a comparison process between corresponding regions, for example, of a size of 4×4 pixels, of the left eye image and the right eye image, that is, a comparison process while corresponding regions are successively moved in the horizontal direction, is calculated. Then, based on the correlation values, a displacement amount is determined in a unit of a block to produce the displacement amount retention table 300.

FIG. 9B illustrates the displacement amount retention table 300 which retains a displacement amount calculated from the left eye image 301 and the right eye image 302 in a unit of a block. In the case where a comparison process is carried out in a unit of a block of 4×4 pixels with regard to the left eye image 301 and the right eye image 302 which are each configured from 1,920×1,080 pixels, 480×270=129, 600 displacement amounts are calculated for the individual blocks. The displacement amounts calculated for the individual blocks in this manner are retained in an associated relationship with the blocks of the calculation object in the displacement amount retention table 300. Further, the displacement amount retention table 300 is produced for each frame which configures a stereoscopic image content of the calculation object. Then, the displacement amount retention table 300 is stored in an associated relationship with the stereoscopic image content of the calculation object in the content accompanying information storage section 122. In this instance, the displacement amount retention tables 300 are stored in an associated relationship with frames which configure the stereoscopic image content of the calculation object.

Further, in FIG. 9B, the displacement amounts are shown placed at positions of the displacement amount retention table 300 corresponding to the positions of the blocks of the left eye image 301. Further, the displacement amounts may be retained otherwise in a unit of a pixel or in a unit of a fraction. However, in FIG. 9B, an example wherein a displacement amount calculated in a unit of a pixel is retained is illustrated to facilitate understandings. Further, while the displacement amount is calculated as any of 0, a positive value representative of a value in a protruding direction or protruding amount and a negative value representative of a value in a retraction direction or a retracted amount, in FIG. 9B, only positive values are illustrated to facilitate understandings.

Example of Binarized Data

Now, binarized data which is an example of a stereoscopic image parameter is described. For example, a stereoscopic material body can be detected by carrying out an edge detection process for a region of the displacement amount retention table 300 in which the displacement amount is "not 0" (non-zero displacement amount region) and which is close to a region in which the displacement amount is "0" (zero displacement amount region).

By the edge detection process, binarized data such as, for example, "1" regarding the region of a stereoscopic material body and "0" regarding any other region, is calculated in a unit of a block of the displacement amount retention table 300. Then, the binarized data of 0 or 1 calculated in a unit of a block of the displacement amount retention table 300 are retained in an associated relationship in the displacement amount retention table 300.

For example, if a closed region in the stereoscopic image is specified with the calculated binarized data of 0 and 1, then the closed region can be determined as a region of a stereoscopic material body. In the case where a region of a stereoscopic material body is specified in this manner, the region corresponding to the material body and the displacement amount of the material body can be associated with each other to make a stereoscopic image parameter. Further, if a plurality of material bodies are included in a stereoscopic image, then regions corresponding to the plural material bodies and displacement amounts of the material bodies can be associated with each other to make stereoscopic image parameters. In the case where a plurality of material bodies are specified in this manner, it is necessary for the regions corresponding to the material bodies to be closed regions. It is to be noted that the content accompanying information storage section 122 may store a stereoscopic image parameter made by associating a region corresponding to each specified material body and a depthwise amount, which is a protruding amount or retracted amount, obtained by conversion of a displacement amount of the specified material body with each other.

Figure 10A:
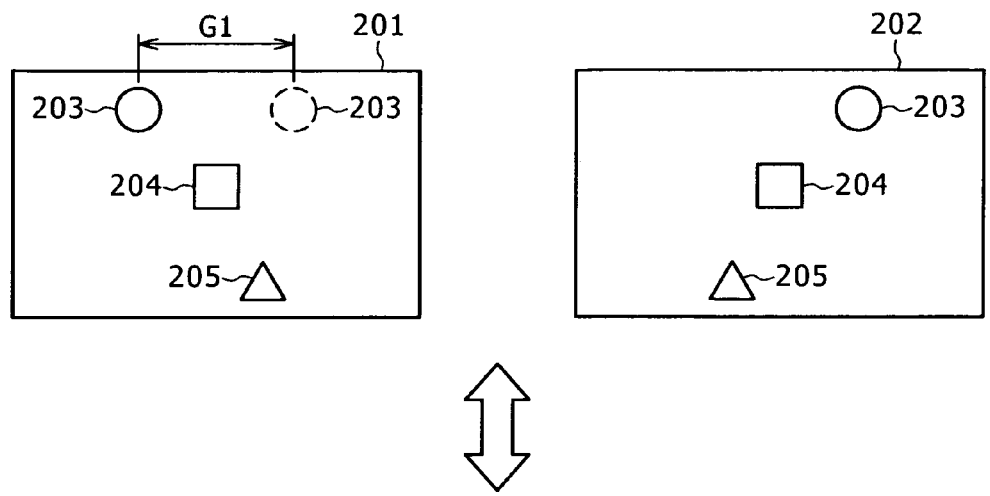
FIGS. 10A and 10B are schematic views illustrating a relationship between a displacement amount in a stereoscopic image content stored in a content storage section shown in FIG. 2 and a displacement amount on a display face of the display section shown in FIG. 2.
Figure 10B:
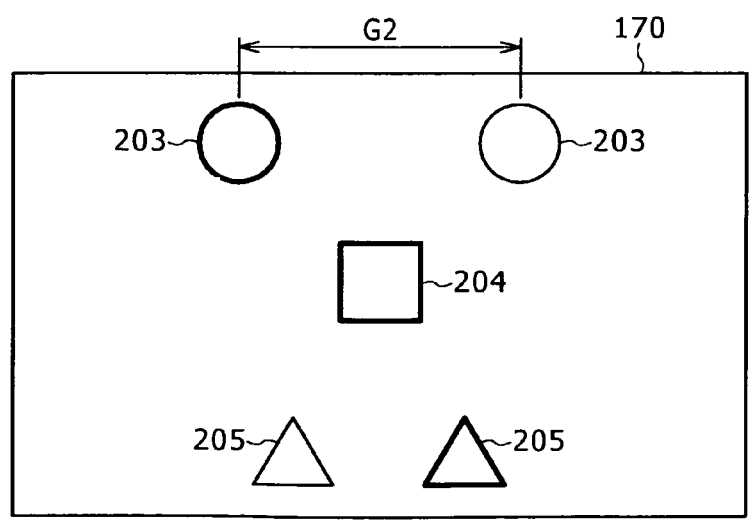

Example of the Relationship between the Displacement Amount on an Image and the Displacement Amount on the Displacement Face FIGS. 10A and 10B illustrate a relationship between a displacement on a stereoscopic image content stored in the content storage section 121 and a displacement on the display face of the display section 181 in the first embodiment of the disclosed technology. More particularly, FIG. 10A shows a left eye image 201 and a right eye image 202 which configure a stereoscopic image. The left eye image 201 and the right eye image 202 shown in FIG. 10A are similar to those shown in FIG. 7B. In FIG. 10A, the displacement amount of a material body 203 on the left eye image 201 from a material body 203 included in the right eye image 202 is represented as displacement amount G1.

FIG. 10B shows a stereoscopic image displayed on the display section 181. It is to be noted that, in FIG. 10B, the left eye image 201 and the right eye image 202 shown in FIG. 10A are shown in a synthesized form. Further, in FIG. 10B, the displacement on the display face of the display section 181, that is, the displacement of the material body 203 included in the left eye image 201 and the right eye image 202, is represented as displacement amount G2.

The sound correction section 140, stereoscopic image correction section 150 and subtitle production section 160 carry out a correction process using a stereoscopic image parameter based on the relationship between the displacement amount on a stereoscopic image and the displacement amount on the display face of the display section 181 in this manner. In this instance, the sound correction section 140, stereoscopic image correction section 150 and subtitle production section 160 carry out a correction process using a stereoscopic image parameter based on a retained conversion table between the displacement amount on a stereoscopic image and the displacement amount on the display face of the display section 181.

Figure 11:
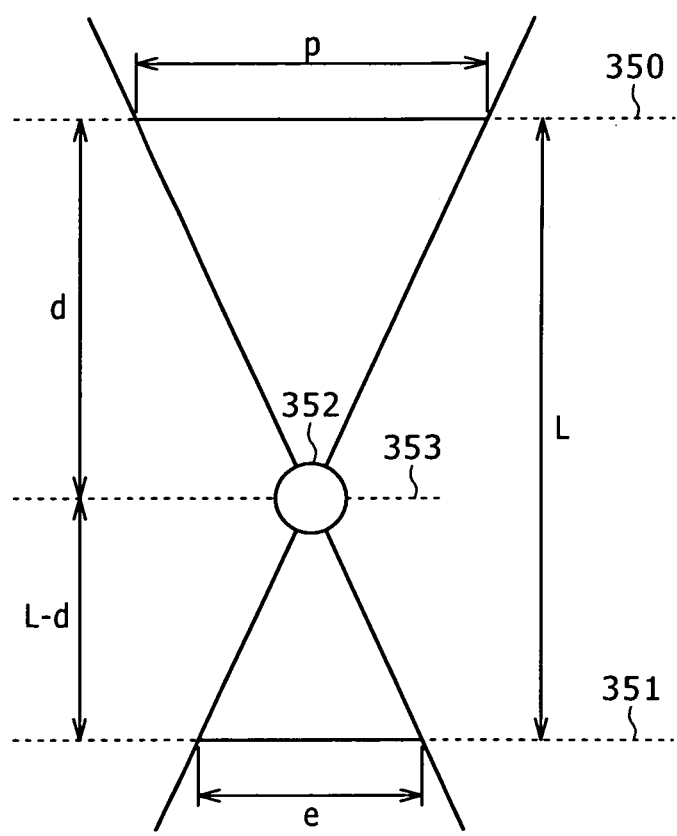
FIG. 11 is a view schematically illustrating a relationship between a viewing position in the case where a stereoscopic image displayed on the display section shown in FIG. 2 is viewed and a protruding position of a material body, that is, a stereoscopic material body, included in the stereoscopic image.

Example of the Relationship between the Viewing Position and the Protruding Position FIG. 11 schematically illustrates a relationship between the viewing position when a stereoscopic image displayed on the display section 181 in the first embodiment of the disclosed technology is viewed and the protruding position of a material body, that is, a stereoscopic material body, included in the stereoscopic image.

Referring to FIG. 11, the position at which a stereoscopic image is displayed, that is, the position on the display face of the display section 181, is represented as a position 350 of the display face, and the viewing position of the user in the case where the stereoscopic image displayed on the display section 181 is viewed is represented as a viewing position 351. Further, the protruding position of a material body, that is, the stereoscopic material body 352, which can be viewed by the user who is viewing the stereoscopic image in this state, is represented as a protruding position 353.

Here, the displacement amount of the stereoscopic material body 352 included in the stereoscopic image, that is, the displacement amount on the display face, is represented by p, the distance between the position 350 of the display face and the viewing position 351 by L, and the distance between both eyes of the user who is viewing the stereoscopic image by e. Further, the distance or protruding amount between the position 350 of the display face and the protruding position 353 is represented by d.

In this instance, the relationship among the position 350 of the display position, the viewing position 351 and the protruding position 353 satisfies, from a similarity relationship, the following expression 1:

$$d:p=(L-d):e \qquad \text{expression 1}$$

If the expression 1 is transformed, then $d=pL(e+p)$ is determined.

In particular, if p=71 mm, l=2,000 mm and e=65 mm are substituted into the expression 1, then the protruding amount d can be determined as 1,044 mm (d=71×2,000/(65+71)).

In this manner, the protruding amount of a material body on a stereoscopic image can be determined using the displacement amount of the material body. Therefore, the stereoscopic image correction section 150 can carry out correction of the depthwise amount, that is, of the protruding amount or the retracted amount, of the material body using the displacement amount of the material body on the stereoscopic image.

Example of Correction of a Stereoscopic Image

FIG. 12A schematically shows a top plan view in the case where a stereoscopic image is displayed on the display section 181 and the positions of the material bodies 203 to 205 included in the stereoscopic image are disposed virtually in the depthwise direction. It is to be noted that the example shown in FIG. 12A is similar to that of FIG. 7A except the distances B1 and S1.

The distance B1 is a distance in the depthwise direction between the material bodies 203 and 204 in the case where the positions of the material bodies 203 to 205 are virtually disposed in the depthwise direction. Meanwhile, the distance S1 is a distance in the depthwise direction between the material bodies 204 and 205 in the case where the positions of the material bodies 203 to 205 are disposed virtually in the depthwise direction.

FIG. 12B schematically shows a top plan view in the case where a stereoscopic image is displayed on the display section 181 after correction by the stereoscopic image correction section 150 and the positions of the material bodies 203 to 205 included in the stereoscopic image are disposed virtually in the depthwise direction.

A distance B2 is a distance in the depthwise direction between the material bodies 203 and 204 in the case where the positions of the material bodies 203 to 205 are disposed virtually in the depthwise direction. Meanwhile, a distance S2 is a distance in the depthwise direction between the material bodies 204 and 205 in the case where the positions of the material bodies 203 to 205 are disposed virtually in the depthwise direction.

In FIG. 12B, the depthwise amount, that is, the protruding amount or retracted amount, of the stereoscopic image is adjusted so as to be in a rather moderated state so that, when the user views a stereoscopic image content for a long time, the eyes of the user may not be fatigued after the long time viewing.

For example, by moving the depthwise position adjustment lever 510 for a stereoscopic image shown in FIG. 6 to the "low" side with respect to the middle, the depthwise amount, that is, the protruding amount or retracted amount, of the stereoscopic material body can be adjusted to a moderated amount. In this instance, the adjustment block 151 can adjust each displacement amount by multiplying the displacement amount in the displacement amount retention table by a constant K (0<K<1). In this instance, in the example of FIGS. 12A and 12B, B2<B1 and S2<S1 are satisfied. In this manner, the protruding amount and the retracted amount of a stereoscopic material body can be reduced to reduce the burden on the eyes of the user.

On the other hand, by moving the depthwise position adjustment lever 510 for a stereoscopic image shown in FIG. 6 to the "high" side with respect to the middle, the depthwise amount, that is, the protruding amount or retracted amount, of the stereoscopic material body can be adjusted so as to be emphasized. In this instance, the adjustment block 151 can adjust each displacement amount by multiplying the displacement amount in the displacement amount retention table by a constant K (1<K). In this manner, the protruding amount and the retracted amount of a stereoscopic material body can be increased for emphasis thereby to promote the stereoscopic effect of the stereoscopic image so that the user can enjoy the stereoscopic image.

In this manner, by adjusting the depthwise amount of a stereoscopic image in response to a user operation, an appropriate stereoscopic image conforming to a personal liking of the user can be provided. In this instance, for example, if setting buttons corresponding to different age groups of viewers such as, for example, a child button, a youth button and an elderly button are provided on the remote controller 500 and are depressed in response to an age group of the user, then an appropriate stereoscopic image suitable for the aged group of the user can be provided. For example, if the child button or the elderly button is depressed, then the stereoscopic image and the associated sound may be set to a moderated level. On the other hand, if the youth button is depressed, then the stereoscopic image and the associated sound can be set so as to be emphasized.

Further, in the case where the depthwise amount of a stereoscopic image is changed in this manner, that is, in the case where a changing operation is carried out, sound data may be corrected such that a sound image based on the sound data may be localized at a position corresponding to the depthwise amount after the change.

Example of Correction of Sound

Figure 13:
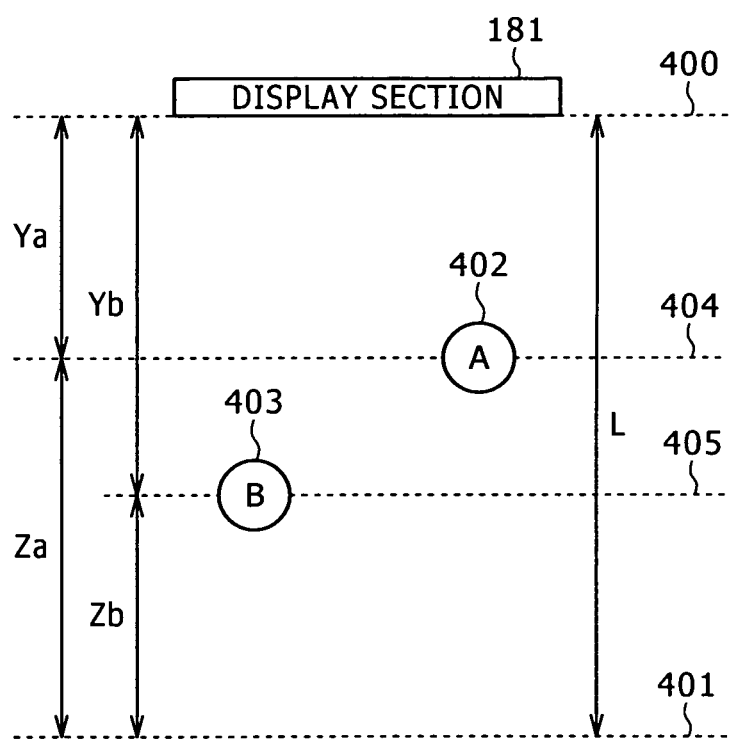
FIG. 13 is a view schematically illustrating a correction method in the case where output sound is corrected by the sound correction section shown in FIG. 2.

FIG. 13 schematically illustrates a correction method in the case where the output sound is corrected by the sound correction section 140 in the first embodiment of the disclosed document. In FIG. 13, a relationship between the viewing position in the case where a stereoscopic image displayed on the display section 181 is viewed and the protruding position of a material body, that is, a stereoscopic material body, included in the stereoscopic image is illustrated schematically.

Referring to FIG. 13, the position at which the stereoscopic image is displayed, that is, the display face of the display section 181, is a position 400 of the display face, and the viewing position of the user in the case where the user views the stereoscopic image displayed on the display section 181 is a viewing position 401. Further, the protruding positions of material bodies A and B, that is, stereoscopic material bodies 402 and 403, which can be observed by the user who is viewing the stereoscopic image in this state are protruding positions 404 and 405, respectively.

Here, the distance between the position 400 of the display face and the viewing position 401 is represented by L, the distance between the position 400 of the display face and the protruding position 404, that is, the protruding amount of the protruding position 404, by Ya, and the distance between the position 400 of the display face and the protruding position 405, that is, the protruding amount of the protruding position 405, by Yb. In this instance, the distance Za between the viewing position 401 and the protruding position 404 is L−Ya, that is, Za=L−Ya, and the distance Zb between the viewing position 401 and the protruding position 405 is L−Yb, that is, Zb=L−Yb.

Therefore, in the case where a stereoscopic image is displayed on the display section 181 and includes a stereoscopic material body 402 which protrudes to the protruding position 404, the filter processing block 147 carries out a filter process in response to the distance Za. Consequently, a sound image can be localized at the protruding position 404 of the stereoscopic material body 402. It is to be noted that the sound image signifies a sensory sound source.

Here, the filter coefficient to be used in the filter processing is determined by a known method that a speaker and a dummy head are installed at a position, or at a distance and in a direction, of a sound source to be localized and a viewing position, respectively, and an impulse response is measured. The method is disclosed, for example, in Japanese Patent Laid-Open No. 2010-178373.

Further, a plurality of filter coefficients, determined by the method described above, which individually correspond to positions, or distances and directions, of different assumable sound sources are stored in advance in an associated relationship with the positions of the sound sources in the retention block 149. Then, the filter determination block 144 selects one of the filter coefficients in response to the depthwise amount, that is, a protruding position or a retracted position, of a stereoscopic material body outputted from the position conversion block 142. In particular, the filter determination block 144 selects a filter coefficient corresponding to a position nearest to the protruding position of the stereoscopic material body. Then, the filter processing block 147 carries out a filtering process using the filter coefficient selected by the filter determination block 144.

Further, the sound can be corrected by carrying out sound volume adjustment. Here, an example wherein sound volume adjustment of the protruding position 405 of the stereoscopic material body 403 which is a material body B is carried out with reference to the protruding position 404 of the stereoscopic material body 402 which is the material body A is described with reference to FIG. 13.

The gain amount used when the sound volume is adjusted is determined from a relationship between the sound pressure and the distance. In particular, where the sound pressure at the protruding position 404 is Ia, the sound pressure Ib at the protruding position 405 can be determined by the following expression 2:

$$Ib = Ia \times (Zb/Za)^2 \quad \text{expression 2}$$

Accordingly, as the gain amount g in the case where the sound volume adjustment at the protruding position 405 is carried out, Ib/Ia, that is, g=Ib/Ia, is determined. In particular, the gain determination block 143 determines Ib/Ia as the gain amount g in the case where sound volume adjustment at the protruding position 405 is carried out based on the position information from the position conversion block 142.

In this manner, the sound volume adjustment block 146 carries out sound volume adjustment at a position forwardly or rearwardly of the protruding position 404, for example, at the protruding position 405, using the gain amount determined by the gain determination block 143. By carrying out a sound volume adjustment process together with a filtering process in this manner, sound information also at a position other than the position corresponding to the head related transfer function filter can be corrected accurately. Further, by carrying out a sound volume adjustment process together with a filtering process in this manner, correction of sound information corresponding to each position can be carried out even if a large number of head related transfer function filters are provided.

In this manner, the protruding amount of a material body on a stereoscopic image can be determined using the displacement position of the material body. Therefore, the sound correction section 140 can carry out correction of sound information of the material body in the stereoscopic image using the displacement amount of the material body.

In this manner, with the first embodiment of the disclosed technology, appropriate stereophonic sound in accordance with a stereoscopic image to be displayed on the display section 181 can be provided to the user. In other words, when a stereoscopic image is to be displayed, sound outputting can be carried out taking the position of the material body in the depthwise direction into consideration. As a result, the user can have a further abundant presence.

Example of Operation of the Information Processing Apparatus

Now, operation of the information processing apparatus 100 in the first embodiment of the disclosed technology is described with reference to the accompanying drawings.

Example of Operation of the Sound Correction Section

Figure 14:
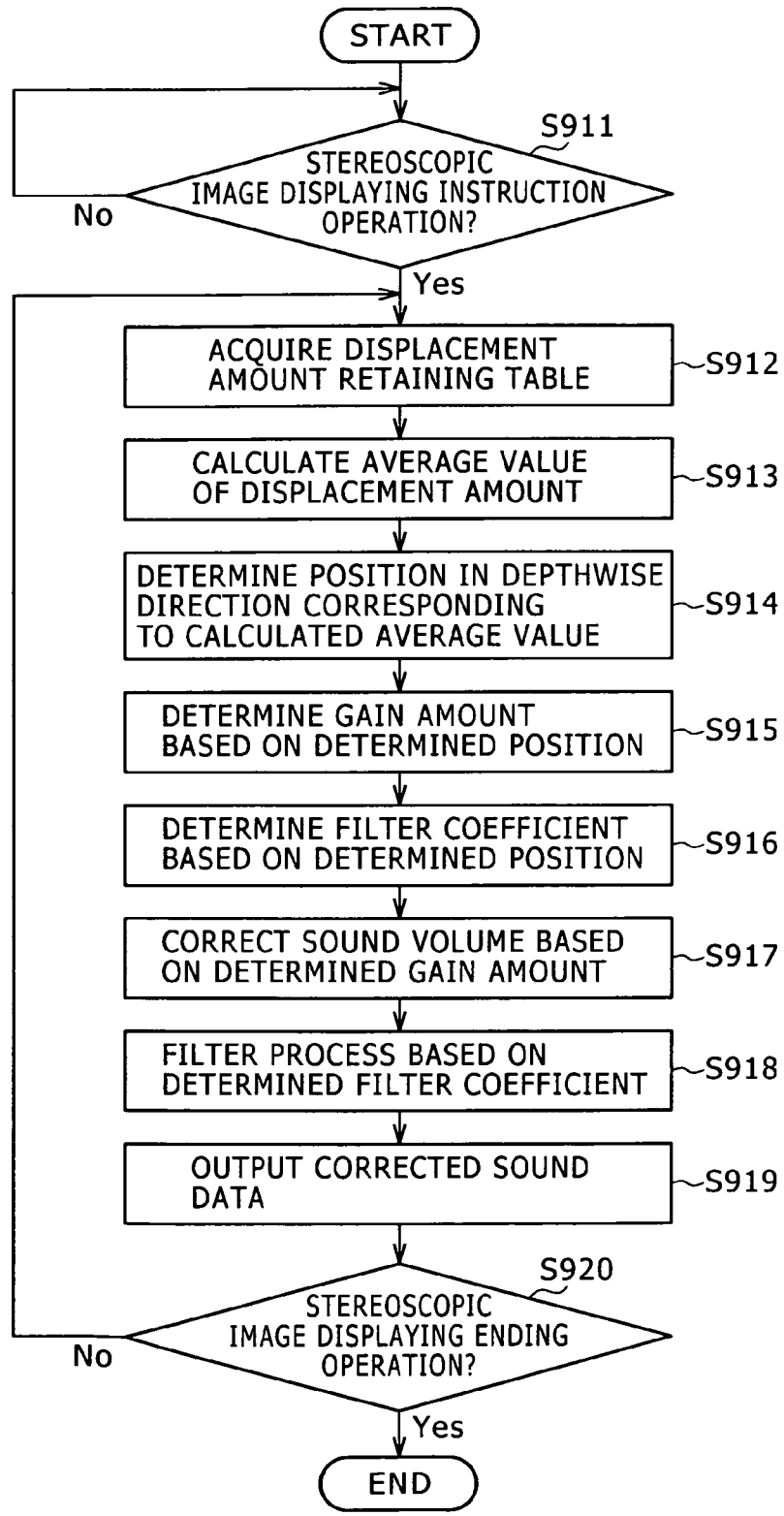
FIG. 14 is a flow chart illustrating an example of a processing procedure of a sound correction process by the sound correction section shown in FIG. 2.

FIG. 14 illustrates an example of a processing procedure of a sound correction process by the sound correction section 140 in the first embodiment of the disclosed technology. In FIG. 14, sound is corrected based on an average value of the displacement amounts of the displacement amount retention table.

First, it is decided at step S911 whether or not a displaying instruction operation of a stereoscopic image is carried out, and if a displaying instruction operation of a stereoscopic image is not carried out, then the supervision is carried out continuously. If a displaying instruction operation of a stereoscopic image is carried out at step S911, then the adjustment value calculation block 141 acquires a displacement amount retention table at step S912 and calculates an average value of displacement amounts of the displacement amount retention table as an adjustment value at step S913.

Then, the position conversion block 142 converts the average value as an adjustment value into a corresponding position, that is, into a position in the depthwise position, at step S914. Then, the gain determination block 143 determines a gain amount for carrying out sound volume adjustment based on the position after the conversion at step S915. Then at step S916, the filter determination block 144 determines a filter coefficient for localizing a sound image at the position based on the position after the conversion.

Then at step S917, the sound volume adjustment block 146 carries out sound volume adjustment using the determined gain amount. Then at step S918, the filter processing block 147 carries out a filtering process using the determined filter coefficient. It is to be noted that the processes at steps S912 to S918 are an example of a correction procedure in the disclosed technique.

Then at step S919, the sound data outputting block 148 outputs the sound data after the correction process to the output controlling section 170. Consequently, the sound data after the correction process are outputted from the output controlling section 170.

Then at step S920, it is decided whether or not a displaying ending operation of a stereoscopic image is carried out. If a displaying ending operation of a stereoscopic image is not carried out, then the processing returns to step S912. On the other hand, if a displaying ending operation of a stereoscopic image is carried out at step S920, then the operation for the sound correction process is ended.

Example of Operation of the Stereoscopic Image Correction Section

Figure 15:
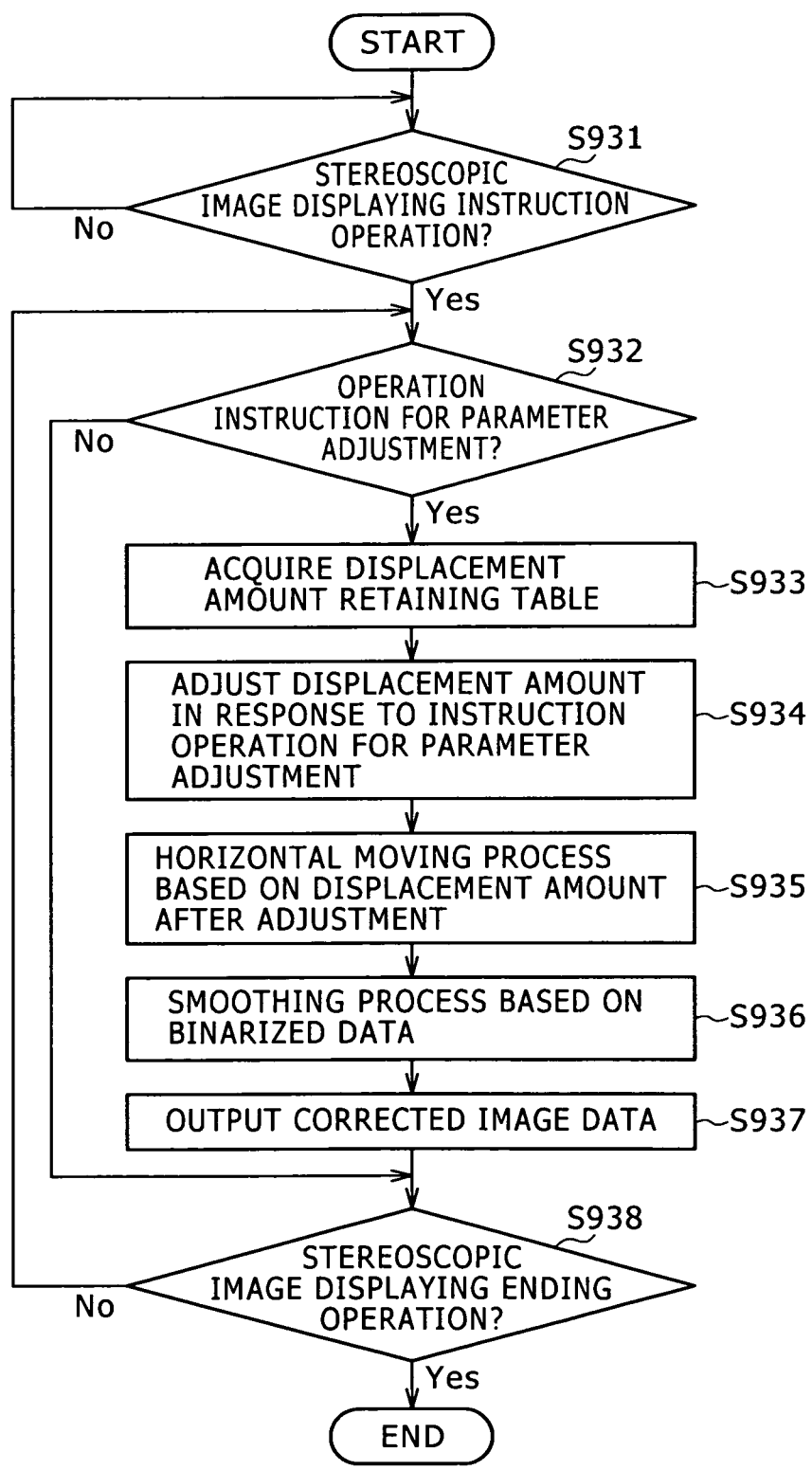
FIG. 15 is a flow chart illustrating an example of a processing procedure of a stereoscopic image correction process by the stereoscopic image correction section shown in FIG. 2.

FIG. 15 illustrates an example of a processing procedure of a stereoscopic image correction process by the stereoscopic image correction section 150 in the first embodiment of the disclosed technology. More particularly, FIG. 15 illustrates an example wherein a stereoscopic image is corrected based on parameter adjustment by a user operation.

First, it is determined at step S931 whether or not a displaying instruction operation of a stereoscopic image is carried out. If a displaying instruction operation of a stereoscopic image is not carried out, then the supervision is carried out continuously. However, if a displaying instruction operation for a stereoscopic image is carried out at step S931, then it is decided at step S932 whether or not an instruction operation for parameter adjustment is carried out. If an instruction operation for parameter adjustment is not carried out, then the processing advances to step S938.

On the other hand, if an instruction operation for parameter adjustment is carried out at step S932, then the adjustment block 151 acquires the displacement amount retention table at step S933. Then, in response to an operation accepted by the operation acceptance section 115, that is, in response to an instruction operation for parameter adjustment, the displacement amounts in the displacement amount retention table are adjusted at step S934.

Then, the horizontal movement processing block 153 carries out a horizontally moving process based on the displacement amounts after the adjustment at step S935, and then the smoothing processing block 154 carries out a smoothing process based on binarized data at step S936. Thereafter, the image data outputting block 155 outputs the image data after the correction process to the output controlling section 170 at step S937.

Then, it is decided at step S938 whether or not a displaying ending operation of a stereoscopic image is carried out. If a displaying ending operation of a stereoscopic image is not carried out, then the processing returns to step S932. On the other hand, if a displaying ending operation of a stereoscopic image is carried out at step S938, then the operation of the image correction process is ended.

Example of Operation of the Subtitle Production Section

FIG. 16 illustrates an example of a processing procedure of a subtitle production process by the subtitle production section 160 in the first embodiment of the disclosed technology. More particularly, in FIG. 16, subtitle data is corrected based on an average value of the displacement amounts in the displacement amount retention table.

First at step S951, it is decided whether or not a displaying instruction operation of a stereoscopic image is carried out. If a displaying instruction operation of a stereoscopic image is not carried out, then the supervision is carried out continuously. On the other hand, if a displaying instruction operation of a stereoscopic image is carried out at step S951, then the adjustment value calculation block 161 acquires a displacement amount retention table at step S952. Then, the adjustment value calculation block 161 calculates an average value of the displacement amounts of the displacement amount retention table as an adjustment value at step S953.

Then at step S954, the subtitle data production block 162 produces subtitle data. Then, the subtitle data production block 162 carries out, regarding the subtitle data or subtitle image thus produced, a horizontally moving process of an image using the average value or adjustment value at step S955. Thereafter, the subtitle data outputting block 163 outputs the produced subtitle data to the output controlling section 170 at step S956.

Thereafter, it is decided at step S957 whether or not a displaying ending operation of a stereoscopic image is carried out. If a displaying ending operation of a stereoscopic image is not carried out, then the processing returns to step S952. On the other hand, if a displaying ending operation of a stereoscopic image is carried out at step S957, then the operation of the subtitle production process is ended.

Example of Correction of Sound with Reference to the Position of a Particular Stereoscopic Image In the foregoing description, an example wherein sound is corrected based on an average value of the displacement amounts in the displacement amount retention table is described. However, for example, in the case where a stereoscopic image including a particular person such as, for example, the user or a family is to be displayed, it is assumed that the user desires to correct the sound with reference to the particular person. Therefore, in the following description, an example wherein sound is corrected with reference to a particular object included in a stereoscopic image is described.

Figure 17A:
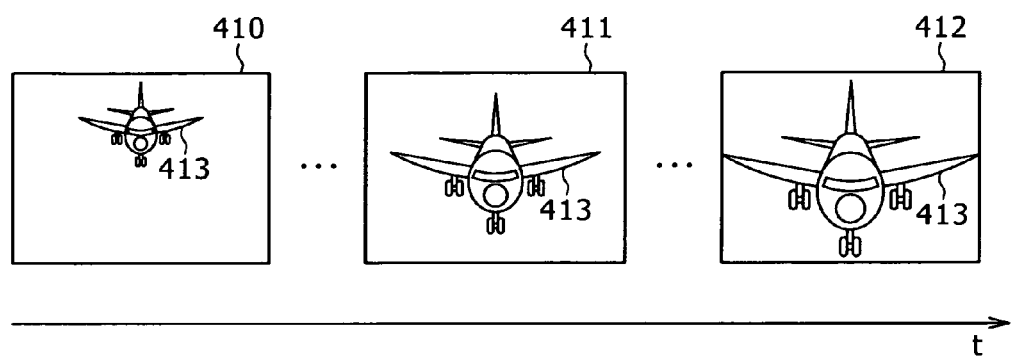
FIGS. 17A and 17B are views schematically showing stereoscopic images displayed on the display section shown in FIG. 2 in a time sequence.
Figure 17B:
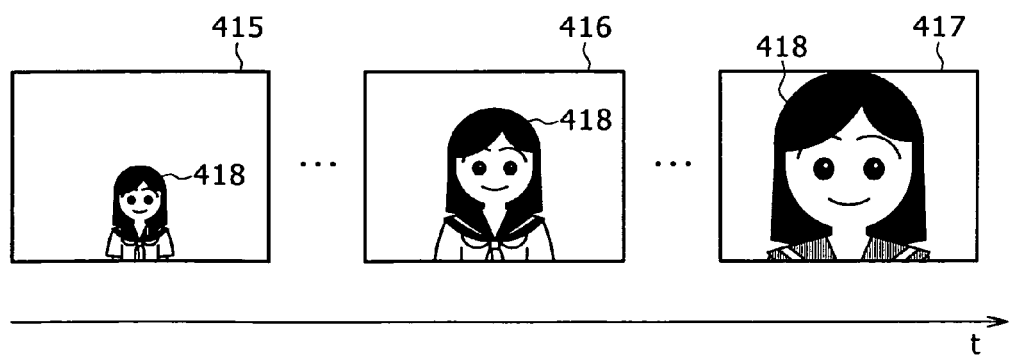

FIGS. 17A and 17B schematically show stereoscopic images displayed on the display section 181 in the first embodiment of the disclosed technology in a time sequence.

More particularly, FIG. 17A shows stereoscopic images 410 to 412 when an airplane 413 which is taking off is imaged from the front side. Meanwhile, FIG. 17B shows stereoscopic images 415 to 417 when a person 418 who is advancing toward the image pickup person side is imaged from the front side.

It is assumed that the stereoscopic images 410 to 412 and 415 to 417 correspond to frames after every fixed interval of time from among frames which configure dynamic pictures for displaying stereoscopic images. In FIGS. 17A and 17B, images of one of a left eye image and a right eye image which configure a stereoscopic image are shown in a time sequence to facilitate understandings.

Further, it is assumed that, when the dynamic picture corresponding to the stereoscopic images 410 to 412 is displayed, the airplane 413 is displayed as a stereoscopic image whose protruding amount is comparatively great. Also it is assumed that, in the case where the dynamic picture corresponding to the stereoscopic images 415 to 417 is displayed, the person 418 is displayed as a stereoscopic material body whose protruding amount is comparatively great.

As seen from FIGS. 17A and 17B, in scenes in which a particular stereoscopic material body, that is, the airplane 413 or the person 418, is successively advancing in a time sequence toward the image pickup person side, sound which is generated from the stereoscopic material body is identified from among audio channels, and the sound is corrected. By carrying out sound correction in this manner, an appropriate sound output further favorable for the user can be carried out.

Example of the Configuration of the Sound Correction Section

Figure 18:
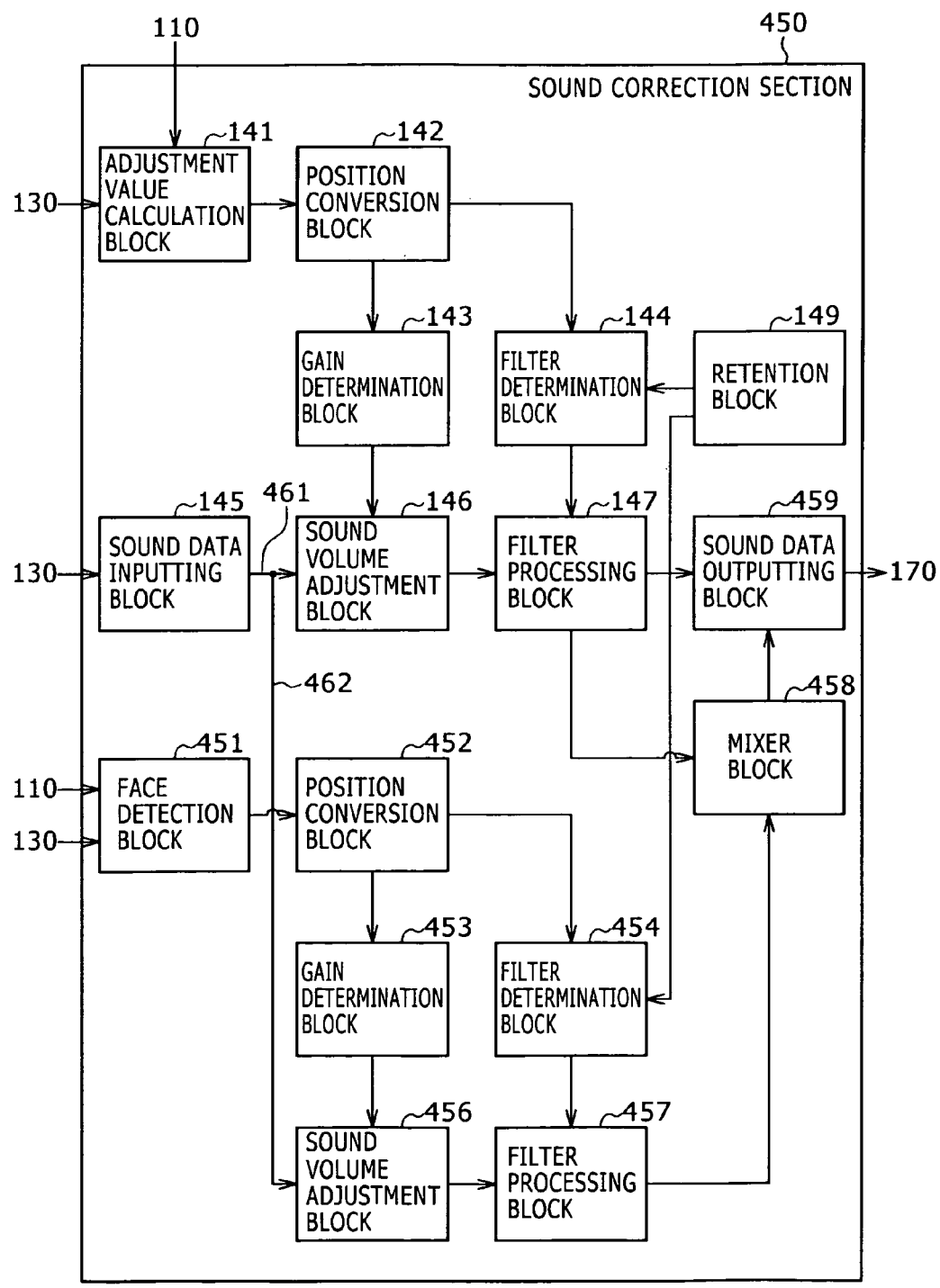
FIG. 18 is a block diagram showing another example of a functional configuration of the sound correction section shown in FIG. 2.

FIG. 18 shows an example of a functional configuration of the sound correction section 450 in the first embodiment of the disclosed technology. It is to be noted that the sound correction section 450 is a partially modified form of the sound correction section 140 shown in FIG. 3. Therefore, overlapping description of common components is omitted herein to avoid redundancy.

Referring to FIG. 18, the sound correction section 450 includes a face detection block 451, a position conversion block 452, a gain determination block 453, a filter determination block 454, a sound volume adjustment block 456, a filter processing block 457, a mixer block 458 and a sound data outputting section 459.

The sound data inputting block 145 receives sound data for a center channel, a left channel and a right channel supplied thereto from the acquisition section 130 as an input thereto, and supplies the sound data to the sound volume adjustment block 146 and the sound volume adjustment block 456. For example, the sound data for the center channel which is a sound channel is supplied to the sound volume adjustment block 456 through a signal line 462 while the sound data for the left and right channels which are main audio channels to the sound volume adjustment block 146 through a signal line 461. Further, the filter processing block 147 outputs sound data after a filtering process to the mixer block 458.

The face detection block 451 detects the face of a person included in image data supplied thereto from the acquisition section 130 under the control of the control section 110. Then, the face detection block 451 outputs face information relating to the detected face, that is, particularly an average value of displacement amounts corresponding to the detected region of the face, to the position conversion block 452. For example, the face detection block 451 detects the face of a person using the displacement amount retention table and binarized data included in a stereoscopic image parameter supplied from the acquisition section 130. For example, the face detection block 451 extracts, from among the displacement amounts in the displacement amount retention table, those displacement amounts in the region relating to the stereoscopic material body specified with the binarized data. Then, the face detection block 451 carries out a matching method between the extracted displacement amounts and pattern images of the face of persons retained in advance to detect the face of the person based on a result of the matching process. It is to be noted that some other detection method may be used. For example, a face detection method similar to that used by a face detection section 620 in a second embodiment of the disclosed technology hereinafter described with reference to FIG. 23 may be used.

The position conversion block 452 converts the face information, that is, an average value, outputted from the face detection block 451 into a position in the depthwise direction for correcting sound data. Then, the position conversion block 452 outputs the position or position information after the conversion to the gain determination block 453 and the filter determination block 454.

The gain determination block 453 determines a gain amount for carrying out sound volume adjustment based on the position information outputted from the position conversion block 452 and outputs the determined gain information to the sound volume adjustment block 456.

The filter determination block 454 determines, based on the position information outputted from the position conversion block 452, a filter coefficient for localizing a sound image at a position corresponding to the position information. The filter determination block 454 outputs the determined filter coefficient to the filter processing block 457.

The sound volume adjustment block 456 carries out sound volume adjustment for the sound data supplied thereto from the sound data inputting block 145 using the gain amount outputted from the gain determination block 453 and outputs the sound data after the sound volume adjustment to the filter processing block 457.

The filter processing block 457 carries out a filtering process for the sound data supplied thereto from the sound data inputting block 145 using the filter coefficient outputted from the filter determination block 454 and outputs sound data after the filtering process to the mixer block 458.

The mixer block 458 mixes the sound data after the filtering process outputted from the filter processing block 147 and the sound data after the filtering process outputted from the filter processing block 157 and outputs the mixed sound data to the sound data outputting section 459.

The sound data outputting section 459 outputs the sound data outputted from the mixer block 458 to the output controlling section 170.

In this manner, the sound correction section 450 corrects, based on the position in the depthwise direction of the face, which is a particular object, of a person detected by the face detection block 451, sound arising from the person. In particular, the sound correction section 450 uses a parameter representative of the position of the face of the person in the depthwise direction, that is, a displacement amount, from among the stereoscopic image parameters to correct the sound data of the center channel, that is, the sound data arising from the person. Further, for example, the sound correction section 450 can use a parameter or displacement amount other than the parameter representative of the position of the face of the person in the depthwise direction to correct the sound data for the left channel and the right channel. For example, the adjustment value calculation block 141 calculates an average value of parameters or displacement amounts other than the parameter representative of the position of the face of the person in the depthwise direction. Then, the adjustment value calculation block 141 can correct the sound data for the left channel and the right channel based on the calculated average value.

It is to be noted that, while, in the example described above, the face of a person is detected as a particular object, some other particular object detection method may be used to detect a particular object such as, for example, an airplane, an automobile or the human body. For example, a detection method wherein histograms of oriented gradients (HOG) are used to carry out material body detection can be used to detect a particular object as disclosed, for example, in Japanese Patent Laid-Open No. 2010-067102.

Example of Correction of Sound with Reference to the Position of the Background

In the foregoing description, an example wherein sound is corrected with reference to a particular object included in a stereoscopic image is described. However, sound may be corrected otherwise with reference to a different region included in a stereoscopic image. For example, the background region included in a stereoscopic image, or in other words, a region other than a stereoscopic image, may be used as a reference to correct sound, that is, background sound, relating to the background region. For example, it is possible to use binarized data to specify a background region. Particularly, a region in which the binarized data is "0" is a background region. Meanwhile, background sound can be extracted from a surround channel. Then, a sound image of the background sound in the audio channel is localized at a position corresponding to the background region. As a result, optimum stereophonic sound can be provided to the user.

Example of Correction of a Stereoscopic Image Based on a Scene Change

In the foregoing, an example wherein a stereoscopic image is corrected in accordance with a user operation. Here, it is supposed that, for example, upon changeover from a broadcasting program to a CM (Commercial Message) or upon channel changeover or scene changeover, a change from a stereoscopic image to a plane image or reversely from a plane image to a stereoscopic image may occur. If such a sudden change as a change from a stereoscopic image to a plane image or from a plane image to a stereoscopic image occurs, then the user may possibly have a discomfort feeling. In the following, an example wherein a stereoscopic image is corrected with reference to a CM changeover or a channel changeover is described. It is to be noted that the configuration of the information processing apparatus in this example is substantially similar to the configuration described hereinabove with reference to FIG. 2 or the like. Therefore, description of components of the information processing apparatus common to those of the information processing apparatus 100 shown in FIG. 2 and so forth is omitted herein to avoid redundancy.

It is to be noted that, as a detection method upon scene change, for example, a method wherein an object image and an immediately preceding image or neighboring image are compared with each other to detect an image which exhibits a sudden change to analyze whether or not the object image is a cut change point or scene change point can be used. As the cut change detection method, for example, a method of using a histogram similarity and a spatial correlation image similarity between images to determine a cut change as disclosed, for example, in Japanese Patent Laid-Open No. 2008-83894 can be used. According to this method, an image change between an object image and a neighboring image is a cut change based on the histogram similarly and the spatial correlation image similarity regarding the object image and the neighboring image. It is to be noted that a CM changeover may be detected based on a video signal from the broadcasting reception section. Meanwhile, a channel changeover can be detected based on a user operation accepted by the remote controller 500 or the operation acceptance section 115.

Example of Correction of a Stereoscopic Image Based on CM Changeover

Figure 19A:
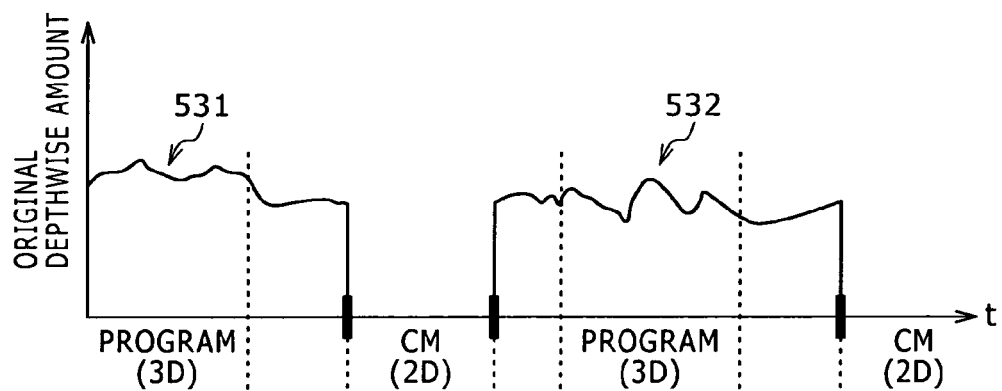
FIGS. 19A and 19B, 20A and 20B, and 21A and 21B are diagrammatic views illustrating different examples of adjustment of the depthwise amount by the stereoscopic image correction section shown in FIG. 2.
Figure 19B:
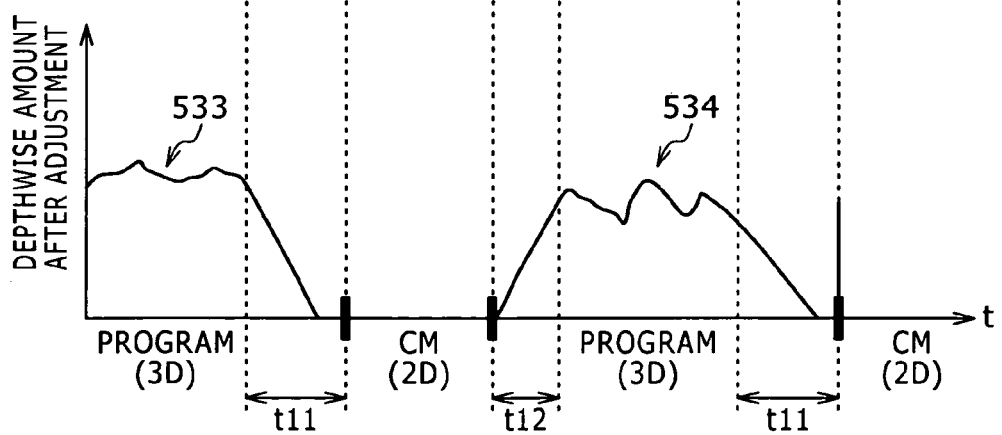

FIGS. 19A and 19B illustrate an example of adjustment of the depthwise amount by the stereoscopic image correction section 150 in the first embodiment of the disclosed technology. In FIGS. 19A and 19B, a variation of the depthwise amount corresponding to one displacement amount, that is, one block, from among the displacement amounts retained in the displacement amount retention table 300 is schematically illustrated in a time sequence. Further, in the example illustrated in FIGS. 19A and 19B, it is assumed that a broadcasting program is displayed as a stereoscopic image and a CM is displayed as a plane image.

In FIG. 19A, the depthwise amount of a stereoscopic image before adjustment is illustrated in a time sequence. Curves 531 and 532 shown in FIG. 19A correspond to transitions of the depthwise amount of a broadcasting program, that is, a program (3D), displayed as a stereoscopic image. It is assumed that, after the broadcasting programs, that is, the programs (3D)), corresponding to the curves 531 and 532, a CM (2D) is displayed as a plane image.

As seen in FIG. 19A, upon changeover from the broadcasting program, that is, from the program (3D), corresponding to the curve 531 to the CM (2D), the depthwise amount varies suddenly. Similarly, upon changeover from the CM (2D) to the broadcasting program, that is, the program (3D), corresponding to the curve 532 and upon change over from the broadcasting program, that is, the program (3D), corresponding to the curve 532 to the CM (2D), the depthwise amount varies suddenly. In the case where the depthwise amount varies in this manner, there is the possibility that the user who has observed the stereoscopic image may have a discomfort feeling. For example, upon changeover from the broadcasting program, that is, from the program (3D), to the CM (2D), since the image suddenly changes over from a stereoscopic image to a plane image, there is the possibility that the user may have a discomfort feeling. Therefore, upon changeover from the broadcasting program, that is, from the program (3D), to the CM (2D), the depthwise amount is adjusted in such a manner as seen in FIG. 19B so that the discomfort feeling which may be provided to the user upon changeover from a stereoscopic image to a plane image can be reduced.

In FIG. 19B, the depthwise amount of the stereoscopic material body after the adjustment is illustrated in a time sequence. A curve 533 shown in FIG. 19B corresponds to a transition of the depthwise amount after the depthwise amount corresponding to the curve 531 shown in FIG. 19A is adjusted. Meanwhile, another curve 534 shown in FIG. 19B corresponds to a transition of the depthwise amount after the depthwise amount corresponding to the curve 532 shown in FIG. 19A is adjusted.

For example, upon changeover from a broadcasting program, that is, from a program (3D), to a CM (2D), the adjustment block 151 shown in FIG. 4 carries out adjustment from a depthwise amount, that is, a displacement amount, prior by a predetermined period of time, for example, by a period t11, to the boundary time. For example, for a period of time from the start to the end of the period t11, the adjustment can be carried out by multiplying the depthwise amount by a parameter a which decreases as the time elapses. This parameter a various to a value, for example, within the range of $0 \leq a \leq 1$, and at the start of the period t11, the parameter a is a=1, and at the end of the period t11, the parameter a is a=0. Further, for a period of time from the start to the end of the period t11, the parameter a varies so as to decrease from 1 to 0 in response to the lapse of time.

On the other hand, for example, upon changeover from a CM (2D) to a broadcasting program, that is, to a program (3D), the adjustment block 151 shown in FIG. 4 carries out adjustment of the depthwise amount, that is, the displacement amount for a predetermined period of time, for example, for a period t12, after the boundary time. For example, the adjustment is carried out by multiplying the depthwise amount by a parameter b which increases in response to lapse of time for a period of time from the start to the end of the period t12. This parameter b varies to a value, for example, within the range of $0 \leq a \leq 1$, and at the start of the period t12, the parameter b is b=0, but at the end of the period t12, the parameter b is b=1. Further, the parameter b varies so as to increase from 0 to 1 in response to lapse of time for the period of time from the start to the end of the period t12.

Example of Correction of a Stereoscopic Image Based on Channel Changeover

Figure 20A:
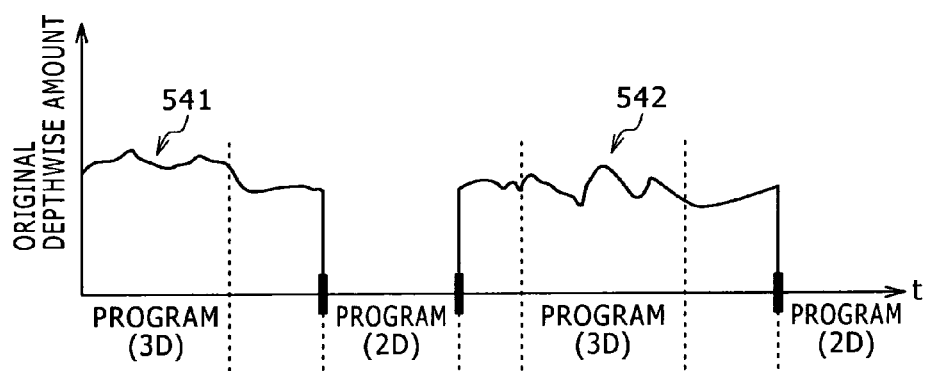
Figure 20B:
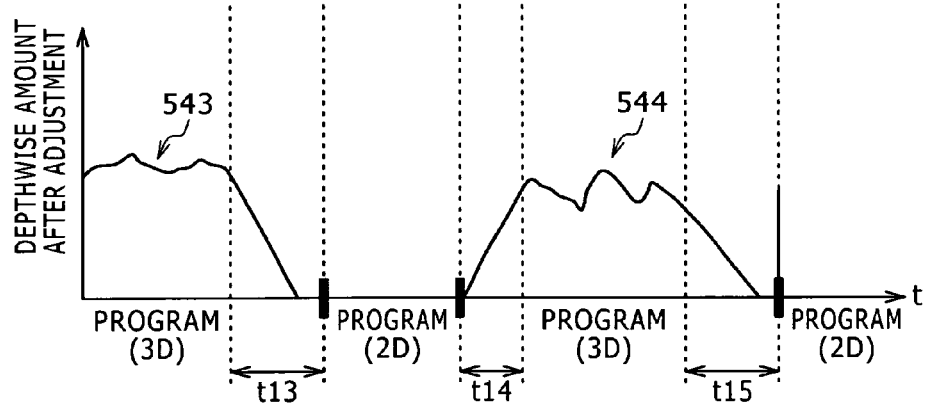

FIGS. 20A and 20B illustrate an example of adjustment of the depthwise amount by the stereoscopic image correction section 150 in the first embodiment of the disclosed technology. In FIGS. 20A and 20B, the variation of the depthwise amount corresponding to one displacement amount, that is, one block, from among the displacement amounts retained in the displacement amount retention table 300, is schematically illustrated in a time sequence. Further, in the example illustrated in FIGS. 20A and 20B, it is assumed that one of a stereoscopic image and a plane image is displayed.

It is to be noted that the example illustrated in FIGS. 20A and 20B is a modification to the example illustrated in FIGS. 19A and 19B and is substantially similar to the example of FIGS. 19A and 19B except a CM (2D) period and a program (2D) period.

It is to be noted that, while, in the examples illustrated in FIGS. 19A, 19B and 20A, 20B, examples of correction of a stereoscopic image upon CM changeover and upon channel changeover are illustrated, also upon scene change, correction of a stereoscopic image can be carried out similarly.

In this manner, upon CM changeover, upon scene change and upon channel changeover, the discomfort feeling of the viewer can be eliminated by adjustment of the depthwise amount.

Example of Correction of a Stereoscopic Image upon Special Reproduction

In the foregoing description, an example of correction of a stereoscopic image upon scene change is described. Here, also it can be supposed that the user may view a stereoscopic image, for example, by a special reproduction method such as, for example, double speed reproduction. In the case where a stereoscopic image is displayed by such a special reproduction method as just mentioned, since the reproduction speed is higher than that in ordinary stereoscopic image display, the user may feel that the stereoscopic image is hard to watch. Therefore, in the following description, an example wherein a stereoscopic image is corrected when the stereoscopic image is displayed by a special reproduction method is described. It is to be noted that the information processing apparatus in this instance has a configuration substantially similar to that described hereinabove with reference to FIG. 2 and so forth. Therefore, overlapping description of the similar configuration is omitted herein to avoid redundancy.

Figure 21A:
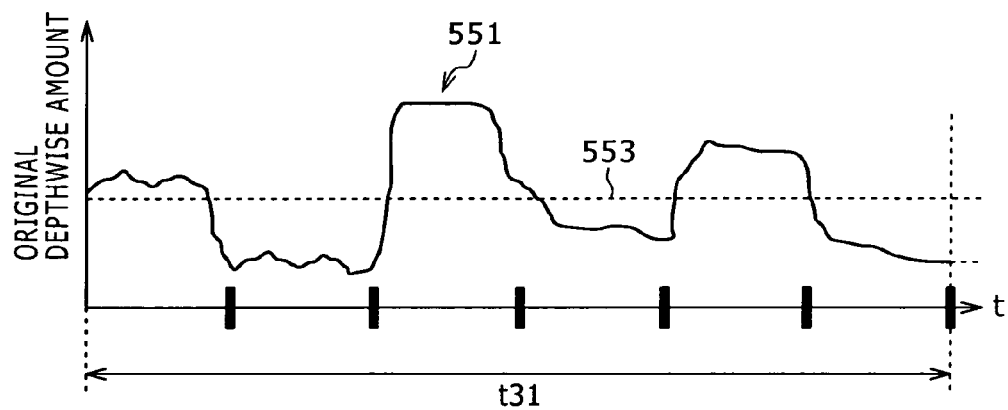
Figure 21B:
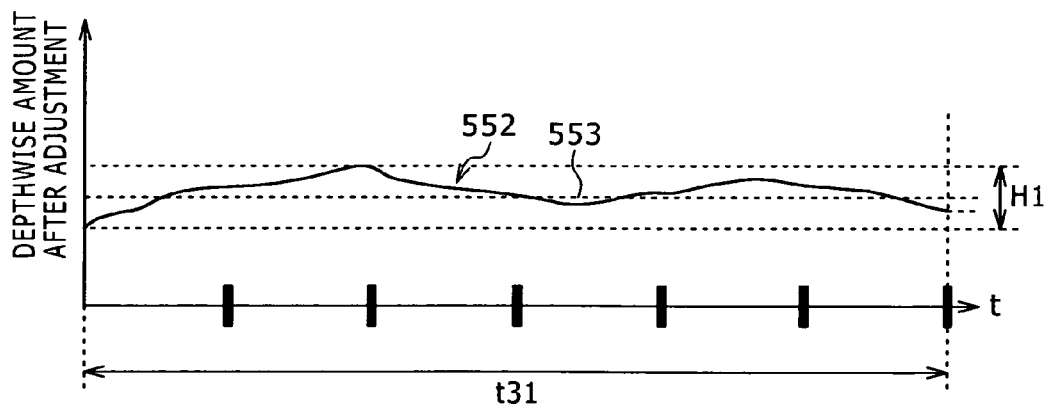

FIGS. 21A and 21B illustrate an example of adjustment of the depthwise amount by the stereoscopic image correction section 150 in the first embodiment of the disclosed technology. More particularly, FIGS. 21A and 21B schematically illustrate a variation of the depthwise amount corresponding to one displacement amount or one block from among the displacement amounts retained in the displacement amount retention table 300 in a time sequence. Further, in the example illustrated in FIGS. 21A and 21B, it is assumed that predetermined multiple speed reproduction such as, for example, double speed reproduction or triple speed reproduction is being carried out.

Here, in the case where predetermined multiple speed reproduction is carried out, a stereoscopic image content of a display object is displayed while some of frames thereof are sampled out. For example, if double speed reproduction is carried out, then a stereoscopic image content of a display object is displayed while every other one of frames which configure the stereoscopic image content is sampled out. Therefore, when predetermined multiple speed reproduction is carried out, the displacement amount retention table associated with a frame which makes an object of sampling out is not used. This makes it possible to rapidly carry out a correction process of the stereoscopic image.

FIG. 21A illustrates the depthwise amount of a stereoscopic image before adjustment in a time sequence. A curve 551 shown in FIG. 21A corresponds to a transition of the depthwise amount of the stereoscopic image. FIG. 21B illustrates the depthwise amount of the stereoscopic image after the adjustment in a time sequence. A curve 552 shown in FIG. 21B corresponds to a transition of the depthwise amount after the depthwise amount corresponding to the curve 551 shown in FIG. 21A is adjusted.

For example, if predetermined multiple speed reproduction such as, for example, double speed reproduction or triple speed reproduction is being carried out, then it is possible to detect a scene change and adjust the depthwise amount based on a result of the detection as described hereinabove. In particular, the adjustment is carried out such that the depthwise amount does not exhibit a sudden change across a scene change.

Or, for example, an average value of the depthwise amount within a fixed period of time may be calculated using the displacement amount retention table associated with a frame which doe's not make an object of sampling out such that the depthwise amount within the fixed period of time is adjusted so that the depthwise amount may remain within a fixed range from the average value. For example, it is possible to calculate an average value 553 of the depthwise amount within a period t31 and adjust the depthwise amount within the period t31 such that it may have a value within a fixed range H1 from the average value 553. In particular, if an instruction operation for the instruction for multiple speed reproduction of a stereoscopic image is accepted, then the stereoscopic image correction section 150 corrects the position of a material body included in the stereoscopic image in the depthwise direction so that the variation of the position of the material body in the depthwise direction may remain within the fixed range.

Or, for example, the depthwise amount may otherwise be adjusted by being multiplied by a parameter cn (n is a positive integer) which decreases in response to the magnification of the multiple speed reproduction. This parameter cn has a value within a range of, for example, $0 \leq cn \leq 1$ and satisfies a relationship of . . . c4 (parameter upon quadruple speed reproduction)<c3 (parameter upon triple speed reproduction)<c2 (parameter upon double speed reproduction) <c1 (parameter upon normal speed reproduction)=1.

This makes it possible to reduce the fluctuation of the depthwise amount among frames upon multiple speed reproduction to reduce the burden on the eyes of the user. Further, upon special reproduction operation, the disagreeable feeling of the user can be eliminated by adjusting the depthwise amount.

It is to be noted that, when correction of a stereoscopic image upon CM changeover, correction of a stereoscopic image upon channel changeover, correction of a stereoscopic image upon special reproduction or the like described above is carried out, the depthwise amount after adjustment. may be used to carry out correction of the sound. Further, whether or not correction of sound may be carried out together with correction of an image in this manner may be set by a user operation.

Example of Correction when a Plurality of Screens are Displayed Simultaneously

In the example described above, a stereoscopic image based on a stereoscopic image content is displayed as one screen, that is, as one screen image, on the display section 181. Here, a case is assumed wherein, for example, an information processing apparatus which can display a plurality of screens, that is, a plurality of screen images such as a main screen and a sub screen on the same display panel displays stereoscopic images individually on the plural screens. In this instance, if the stereoscopic images displayed on the plural screens are different from each other in substance, then correction of the stereoscopic images for the individual screens can be carried out. Therefore, in the following description, an example wherein, in the case where a plurality of screens are displayed simultaneously on the same display panel, correction of stereoscopic images displayed on the screens is carried out for each screen is described.

Figure 22A:
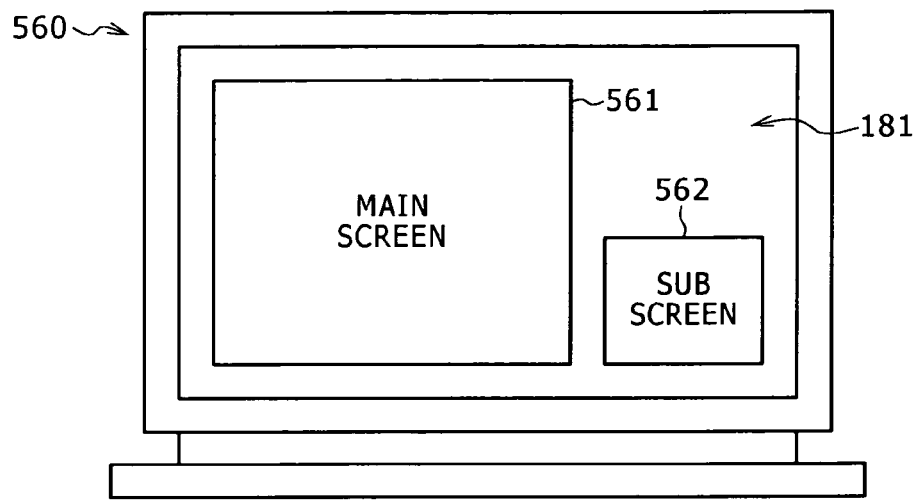
FIG. 22A is a schematic view showing an example of an appearance configuration of the information processing apparatus shown in FIG. 2
Figure 22B:
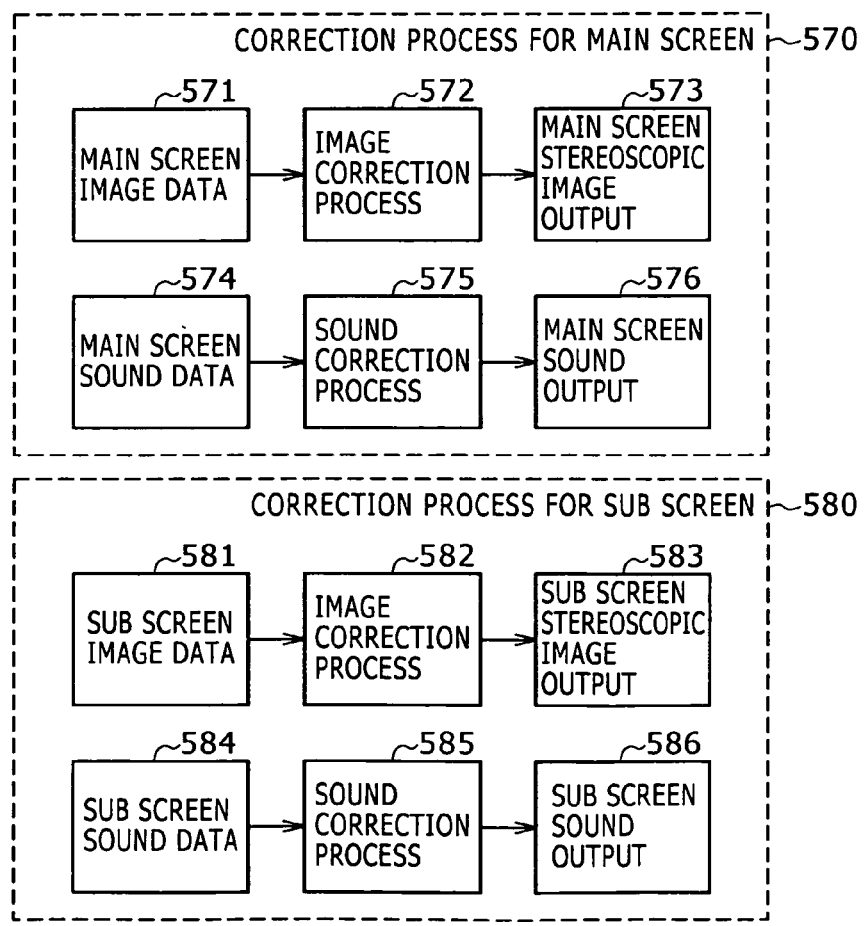
FIG. 22B is a block diagram illustrating a flow of a correction process by the information processing apparatus in a simplified form.

FIGS. 22A and 22B illustrate an example of an appearance configuration and a flow of a correction process of the information processing apparatus 560 in the first embodiment of the disclosed technology in a simplified form. It is to be noted that the information processing apparatus in the present example is substantially similar to that described hereinabove with reference to FIG. 2 and so forth. Therefore, overlapping description of common components to those of the information processing apparatus 100 described hereinabove with reference to FIG. 2 and so forth is omitted herein to avoid redundancy.

More particularly, FIG. 22A shows an example of an appearance configuration of the front side as an appearance configuration of the information processing apparatus 560. Referring to FIG. 22A, for example, on the display section 181 of the information processing apparatus 560, a main screen 561 and a sub screen 562 are displayed. Further, the information processing apparatus 560 can display different stereoscopic images from each other on the main screen 561 and the sub screen 562.

FIG. 22B illustrates a flow of a correction process by the information processing apparatus 560 in a simplified form. In particular, the example illustrated in FIG. 22B is similar to the correction process described hereinabove except that two stereoscopic images displayed at the same time are corrected in different manners from each other. Referring to FIG. 22B, as an image correction process of the correction process 570 for the main screen, an image correction process 572 is carried out for main screen image data 571, that is, for image data which make an object of display of the main screen 561. Then, main screen stereoscopic image output 573 of the image data after the correction is carried out. Meanwhile, as a sound correction process of the correction process 570 for the main screen, a sound correction process 575 for main screen sound data 574 is carried out. Then, main screen sound output 576 is carried out with regard to the sound data after the correction.

Further, as an image correction process of the correction process 580 for the sub screen, an image correction process 582 is carried out with regard to sub screen image data 581, which make an object of display of the sub screen 562. Then, sub screen stereoscopic image output 583 is carried out with regard to the image data after the correction. Meanwhile, as a sound correction process of the correction process 580 for the sub screen, a sound correction process 585 is carried out with regard to sub screen sound data 584. Then, sub screen sound output 586 is carried out with regard to the sound data after the correction.

Or, the correction process 570 for the main screen and the correction process 580 for the sub screen may be carried out based on the same setting substance or may be carried out individually based on different setting substances. Or, the setting substances may be changed in response to the size of the main screen 561 and the sub screen 562 set by a user operation.

It is to be noted that, while, in the example of FIGS. 22A and 22B, two screens are displayed at the same time on the same display panel, display of three or more screens can be carried out similarly.

In this manner, in the case where the main screen 561 and the sub screen 562 are displayed, an abundant presence can be provided on the individual screens by adjusting the depthwise amount with regard to each screen.

<2. Second Embodiment>

In the first embodiment of the disclosed technology, an example wherein sound correction and image correction are carried out based on various kinds of information relating to a user operation or a stereoscopic image. Here, since a stereoscopic image provides a difference between an actual display position of a displayed material body and a position of the material body at which the user looks by illusion, it is supposed that the user may have a discomfort feeling. Therefore, in the second embodiment of the disclosed technology, an example is described wherein the feeling of fatigue of the eyes of the user arising from such a discomfort feeling as just described is moderated.

Example of the Configuration of the Information Processing Apparatus

Figure 23:
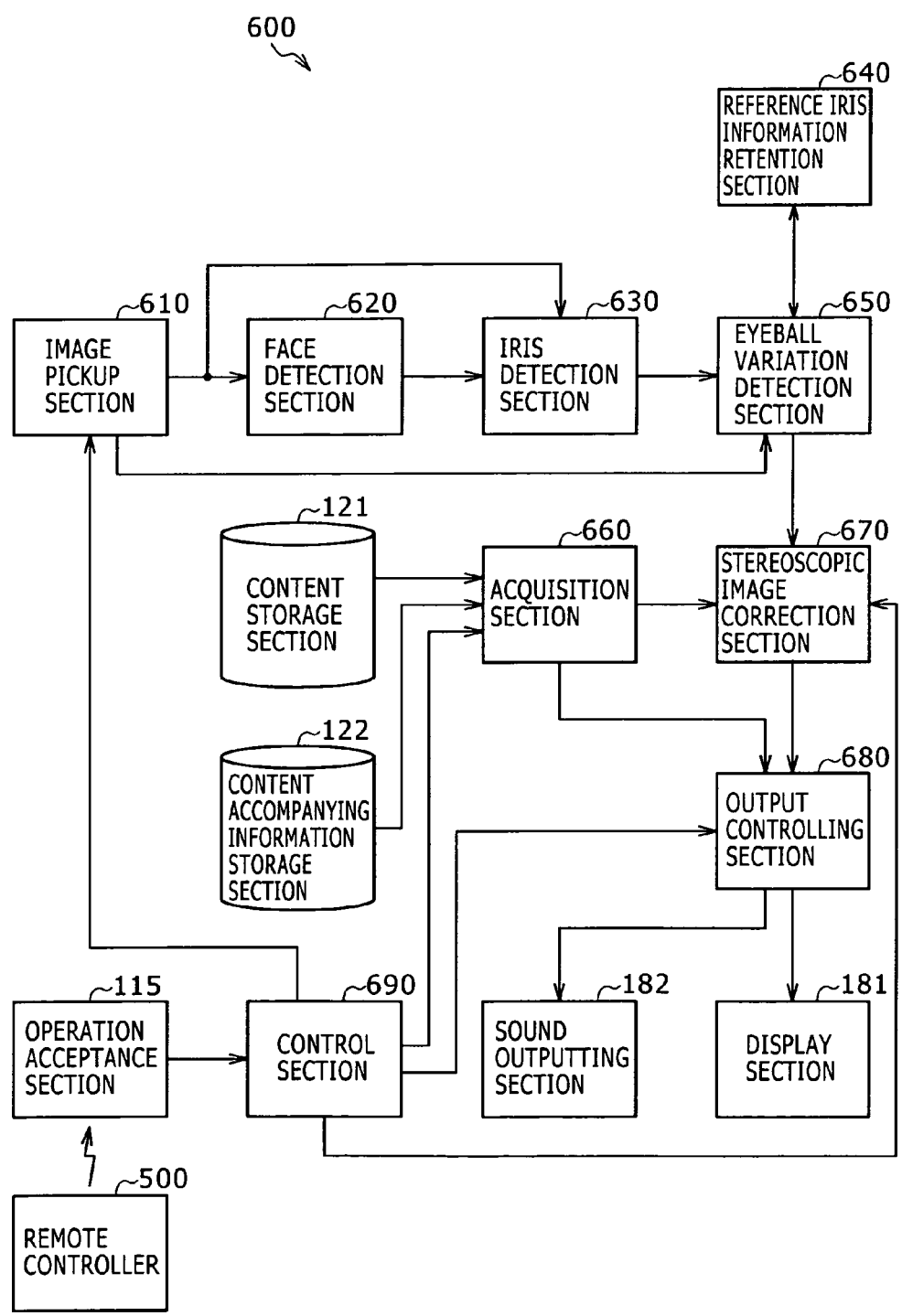
FIG. 23 is a block diagram showing an example of a functional configuration of an information processing apparatus according to a second embodiment of the disclosed technology.

FIG. 23 shows an example of a functional configuration of an information processing apparatus 600 according to the second embodiment of the disclosed technology.

Referring to FIG. 23, the information processing apparatus 600 includes an image pickup section 610, a face detection section 620, an iris detection section 630, and a reference iris information retention section 640. The information processing apparatus 600 further includes an eyeball variation detection section 650, an acquisition section 660, a stereoscopic image correction section 670, an output controlling section 680 and a control section 690. The information processing apparatus 600 further includes an operation acceptance section 115, a content storage section 121, a content accompanying information storage section 122, a display section 181, a sound outputting section 182 and a remote controller 500 which are substantially similar to those shown in FIG. 2. Thus, overlapping description of those components which are common to those of the information processing apparatus 100 shown in FIG. 2 is omitted herein to avoid redundancy.

The image pickup section 610 picks up an image of an image pickup object to produce image data or video data under the control of the control section 690, and successively outputs the produced image data to the face detection section 620 and the iris detection section 630. In particular, the image pickup section 610 includes an optical unit, an image pickup device and a signal processing section not shown. In the image pickup section 610, an optical image of an image pickup object incoming through the optical unit is formed on an image pickup face of the image pickup device, and in this state, the image pickup device carries out an image pickup operation. Then, the signal processing section carries out signal processing for the picked up image signal to produce image data. Then, the produced image data are successively outputted at a predetermined frame rate to the face detection section 620 and the iris detection section 630.

The image pickup section 610 may be implemented, for example, from a monocular camera.

Further, the image pickup section 610 includes an auto focus (AF) function for carrying out automatic focusing. This auto focus function is, for example, of the contrast detection type called contrast AF.

Here, an AF process is described. In the AF process, for example, a series of operations which are combinations of a moving operation to a position at which acquisition of contrast information is to be started and an acquisition operation of contrast information, that is, a single time AF process, is carried out repetitively. Every time a single time AF process is executed, the distance from the lens to an image pickup object, that is, an image pickup object distance, can be grasped. In particular, if the image pickup object distance is represented by a, the distance from the lens to an image formed on the image pickup device by b and the focal distance of the lens by f, then the following expression 3 is satisfied:

$$1/a + 1/b = 1/f \qquad \text{expression 3}$$

Based on the expression 3, the image pickup section 610 can calculate the image pickup object distance a=1/(1/f−1/b). Then, the image pickup section 610 outputs the calculated image pickup object distance a to the eyeball variation detection section 650.

It is to be noted that, while, in the second embodiment of the disclosed technology, the image pickup section 610 is built in the information processing apparatus 600, an imaging apparatus as an external apparatus may be utilized in place of the image pickup section 610. For example, an imaging apparatus such as a digital still camera or a digital video camera like, for example, a recorder with an integrated camera having an external output terminal for outputting produced image data to an external apparatus and the information processing apparatus 600 are connected to each other by a wireless circuit or a wire circuit. Then, image data produced by the imaging apparatus can be acquired by the information processing apparatus 600 and successively supplied to the face detection section 620 and the iris detection section 630.

The face detection section 620 detects the face of a person included in the image data outputted from the image pickup section 610 and outputs face detection information relating to the detected face to the iris detection section 630. As a face detection method, for example, such a face detection method which is based on matching between an actual image and templates in which luminance distribution information of the faces is recorded as disclosed, for example, in Japanese Patent Laid-Open No. 2004-133637, a face detection method based on characteristic amounts of the color of the skin, the face of a human being and so forth included in image data and other methods can be used. The face detection information includes the position and the size of the detected face on the image data, that is, on the image. It is to be noted that the position of the detected face on the image data may be, for example, the position of a left upper portion of the face image on the image data, and the size of the detected face on the image data may be, for example, the length of the face image on the image data in the horizontal direction and the vertical direction. Based on the face detection information, a face image which is image data in a rectangular shape including at least part of the face on the image data can be specified.

The iris detection section 630 detects the irises of both eyes of the face included in the image data outputted from the image pickup section 610 and outputs iris information relating to the detected irises to the eyeball variation detection section 650. In particular, the iris detection section 630 extracts, from the image data outputted from the image pickup section 610, a face image corresponding to the face detected by the face detection section 620 using the face detection information including the position and the size outputted from the face detection section 620. Then, the iris detection section 630 detects the irises of the extracted face image. As an iris detection method in this instance, for example, an iris detection method based on matching between an actual image and templates in which luminance distribution information of the irises is recorded and so forth can be used similarly as in the face detection method. The iris information includes the positions of the detected irises on the face image. Based on this iris information, the positions of the irises of both eyes on the image data can be specified. The position of an iris may be, for example, the central position of the iris.

Some other iris detection method may be used. For example, image data outputted from the image pickup section 610 may be binarized such that an iris is detected based on the binarized data on one screen. For example, the image data outputted from the image pickup section 610 is binarized to determine dark pixels and white pixels on individual lines in a horizontal or leftward and rightward direction. Then, a line in which, in a horizontal direction, a number of white pixels within a predetermined range appear successively and another number of dark pixels within another predetermined range appear and besides a number of white pixels within a further predetermined range appear subsequently to the successive dark pixels is extracted as a candidate line of an iris region. Then, in a vertical or upward and downward direction, a region in which a number of such detected candidate lines within a predetermined range successively appear is detected. The detected region can be determined as an iris region.

Or, a measuring apparatus of an eyeball movement may be used to detect an iris. For example, the eyeball movement measuring apparatus is provided at a location of a lens of eyeglasses for exclusive use for observing a stereoscopic image. On the eyeball side of the measuring apparatus, an infrared LED (Light Emitting Diode) and an optical receiver are provided while an imaging apparatus is provided on the outer side of them. Then, an infrared radiation is irradiated on an eyeball and light reflected from the eyeball is detected by the light receiver. The position of the iris portion can be specified thereby.

The reference iris information retention section 640 retains iris information, that is, reference iris information, relating to the iris detected at a predetermined timing by the iris detection section 630, and the retained reference iris information is supplied to the eyeball variation detection section 650.

The eyeball variation detection section 650 detects a variation of an eyeball of the user when a stereoscopic image is displayed on the display section 181, and outputs a result of the detection to the stereoscopic image correction section 670: For example, the eyeball variation detection section 650 causes the distance between the irises detected by the iris detection section 630 at a predetermined timing to be retained as reference iris information, that is, as a reference iris distance, into the reference iris information retention section 640. Then, the eyeball variation detection section 650 compares the reference iris information retained in the reference iris information retention section 640 and iris information outputted from the iris detection section 630 after the predetermined timing with each other to detect a variation of the eyeballs of the user. In this instance, the eyeball variation detection section 650 outputs a difference value between the iris distances of an object of comparison, or a difference value between congestion angles based on the iris distances, as a detection result to the stereoscopic image correction section 670. In other words, the eyeball variation detection section 650 can detect a variation of the eyeballs of the user based on the distance between the irises detected by the iris detection section 630. Here, the predetermined timing may be a timing at which an instruction operation for the instruction to display a stereoscopic image is carried out or a timing at which the power supply to the information processing apparatus 600 is switched on. It is to be noted that, the eyeball variation detection section 650 is an example of a detection section in the disclosed technique.

The acquisition section 660 acquires various kinds of information stored in the content storage section 121 and the content accompanying information storage section 122 under the control of the control section 690 and supplies the acquired information to the associated components.

The stereoscopic image correction section 670 corrects image data when a stereoscopic image content is outputted under the control of the control section 690, and outputs the image data after the correction to the output controlling section 680. In particular, the stereoscopic image correction section 670 corrects the position in the depthwise direction of a material body included in the stereoscopic image based on the detected variation of the eyeballs detected by the eyeball variation detection section 650. In this instance, if the variation of the eyeballs is greater than a reference of a fixed amount, then the stereoscopic image correction section 670 carries out correction such that the position in the depthwise direction of a material body included in the stereoscopic image is moved toward the display face side of the stereoscopic image. Further, the stereoscopic image correction section 670 can determine based on the variation of the eyeballs whether or not the convergence angle of the user corresponding to the stereoscopic image material body is greater than a reference angle which is a fixed angle. Then, if the convergence angle is greater than the fixed reference angle, then the stereoscopic image correction section 670 carries out correction such that the position in the depthwise direction of a material body included in the stereoscopic image is moved to the display face side of the stereoscopic image. In those correction processes, the position of a material body included in the stereoscopic image in the depthwise direction is corrected by adjusting the parameter representative of the position of the material body in the depthwise direction, for example, a displacement amount in the displacement amount retention table. It is to be noted that, the stereoscopic image correction section 670 is an example of a correction section in the disclosed technique.

The output controlling section 680 carries out an outputting process for outputting a content stored in the content storage section 121 in response to an operation input accepted by the operation acceptance section 115. Further, the output controlling section 680 controls the display section 181 to display a reference stereoscopic image including a reference material body for measuring a reference iris distance at a predetermined timing such as upon instruction operation for the instruction to display a stereoscopic image or when the power supply to the information processing apparatus 600 is switched on. It is to be noted that, the output controlling section 680 is an example of a display controlling section in the disclosed technique.

The control section 690 controls the components of the information processing apparatus 600 in accordance with an operation input accepted by the operation acceptance section 115.

Example of the Configuration of the Image Correction Section

Figure 24:
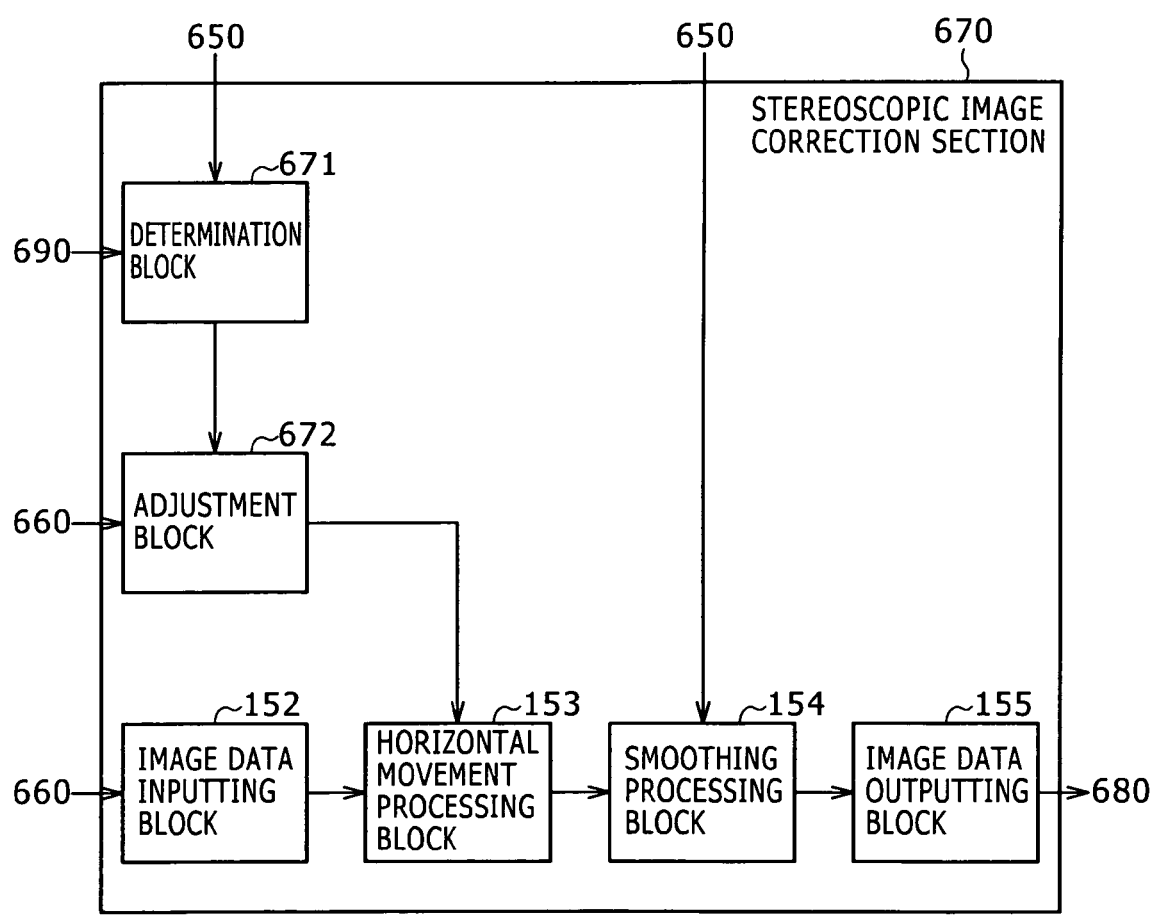
FIG. 24 is a block diagram showing an example of a functional configuration of a stereoscopic image correction section shown in FIG. 23.

FIG. 24 shows an example of a functional configuration of the stereoscopic image correction section 670 in the second embodiment of the disclosed technology. Referring to FIG. 24, the stereoscopic image correction section 670 includes an image data inputting block 152, a horizontal movement processing block 153, a smoothing processing block 154 and an image data outputting block 155 substantially similar to those shown in FIG. 4. Therefore, overlapping description of them is omitted herein to avoid redundancy.

The stereoscopic image correction section 670 further includes a determination block 671 and an adjustment block 672.

The determination block 671 determines whether or not the position of a material body included in the stereoscopic image in the depthwise direction is to be corrected based on the control by the control section 690, and outputs a result of the determination including determination information such as a difference value to the adjustment block 672. In particular, the determination block 671 uses a detection result outputted from the eyeball variation detection section 650, that is, a difference value between the iris distances which make an object of comparison to determine whether or not the variation of the eyeballs, that is, the difference value, is greater than a fixed reference value. Then, if the variation of the eyeballs is greater than the fixed reference value, then the determination block 671 determines that the correction is to be carried out. On the other hand, if the variation of the eyeballs is not greater than the fixed reference value, then the determination block 671 determines that the correction is not to be carried out. In other words, the determination block 671 can determine based on the variation of the eyeballs whether or not the convergence angle of the user corresponding to the stereoscopic material body is greater than a fixed reference angle. Then, if the convergence angle is greater than the fixed reference angle, then the determination block 671 determines that the correction is to be carried out.

The adjustment block 672 adjusts a parameter for correcting image data supplied thereto from the acquisition section 660 based on the determination result outputted from the determination block 671, and outputs the parameter after the adjustment to the horizontal movement processing block 153. In particular, if a determination result that correction is to be carried out is outputted from the determination block 671, then the adjustment block 672 adjusts a parameter for carrying out correction for moving the position of a material body included in the stereoscopic image in the depthwise direction to the display face side for the stereoscopic image. On the other hand, if a determination result that correction is not to be carried out is outputted from the determination block 671, then the adjustment block 672 does not carry out adjustment of the parameter.

Example of an Image Produced by the Image Pickup Section

Figure 25:
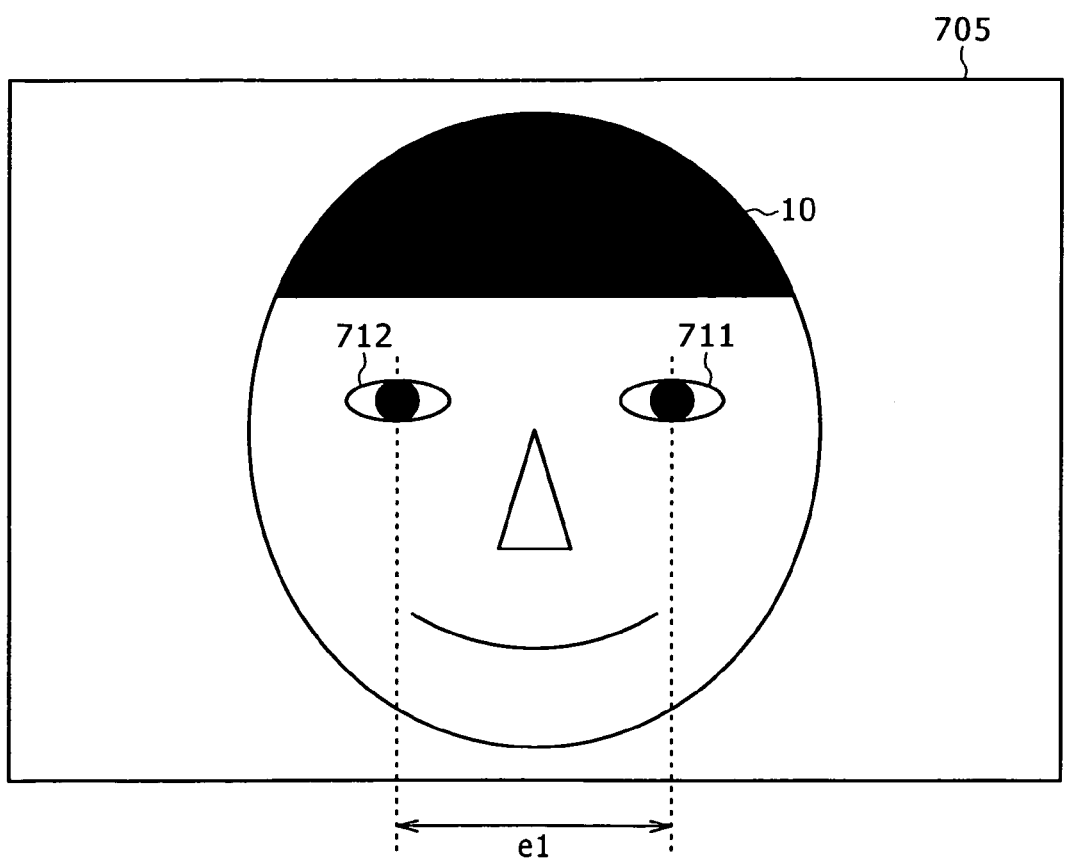
FIG. 25 is a schematic view showing an image produced by an image pickup section shown in FIG. 23 in a simplified form.

FIG. 25 shows an image, that is, an image 705, produced by the image pickup section 610 in the second embodiment of the disclosed technology in a simplified form.

Referring to FIG. 25, the image 705 is an example of an image or image data produced by the image pickup section 610 and includes, for example, the face of the user 10 seated on the chair 11 in front of the information processing apparatus 600 shown in FIG. 1B. It is to be noted that the face of the user 10 included in the image 705 is detected by the face detection section 620. Further, the irises of both eyes, that is, the left eye 711 and the right eye 712, of the user 10 included in the image 705 are detected by the iris detection section 630. Further, in the second embodiment of the disclosed technology, the central position of the iris of the left eye is regarded as the position of the iris of the left eye, and the central position of the iris of the right eye is regarded as the position of the iris of the right eye. Further, in the second embodiment of the disclosed technology, the distance between the central position of the iris of the left eye and the central position of the iris of the right eye is an iris distance. In particular, in the example illustrated in FIG. 25, the distance between the central position of the iris of the left eye 711 and the central position of the iris of the right eye 712 is the iris distance. Since the iris distance has a value corresponding to an actual iris distance e1, it is represented virtually as "e1." It is to be noted that the iris distance e1 can be calculated, for example, based on the image pickup object distance, that is, the distance from the lens to the face of the user 10, the distance from the lens to the image pickup element and the distance between the irises formed as images on the image pickup face of the image pickup element. Further, a fixed value such as, for example, 65 mm may be used as the iris distance e1.

Figure 26A:
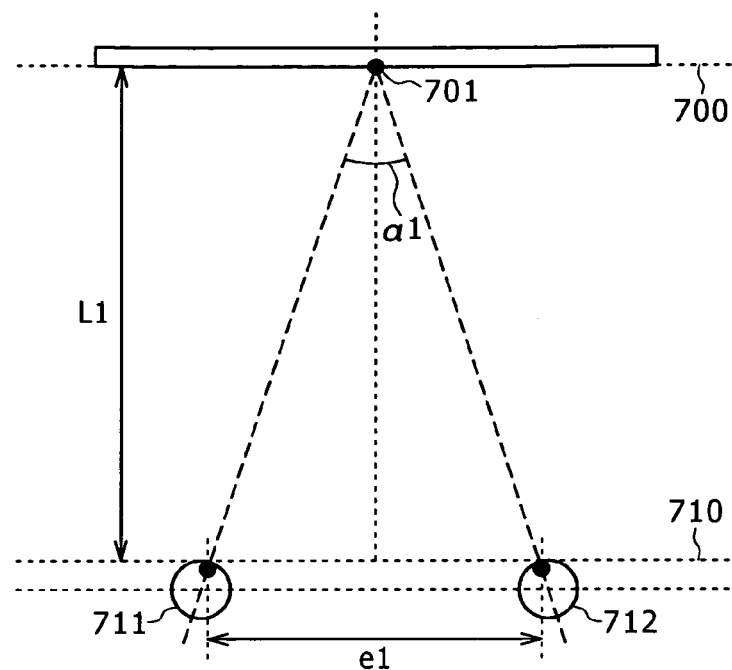
FIGS. 26A and 26B are diagrammatic views schematically illustrating a relationship between a viewing position of a stereoscopic image displayed on a display section shown in FIG. 23 and a convergence angle of a user who is viewing the stereoscopic image.
Figure 26B:
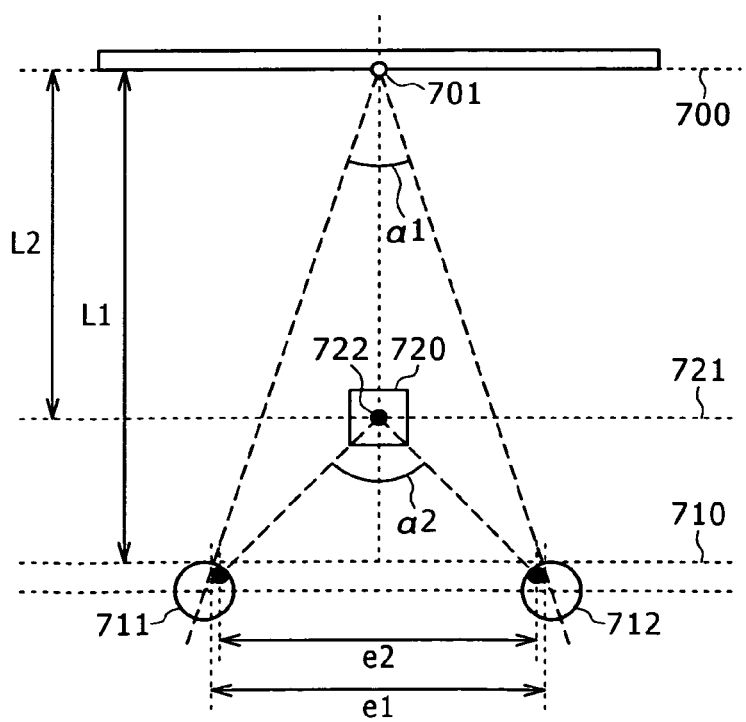

Example of the Relationship among the Viewing Position, Protrusion Position and Convergence Angle FIGS. 26A and 26B schematically illustrate a relationship between the viewing position of a stereoscopic image displayed on the display section 181 in the second embodiment of the disclosed technology and the convergence angle of the user who is viewing the stereoscopic image.

FIG. 26A shows the eyeballs of the user when the user views a plane image or 2D image and a corresponding convergence angle α1. In FIG. 26A, the position at which a stereoscopic image is displayed on the display face of the display section 181 is represented as a position 700 of the display face, and a viewing position of the user when the user views a stereoscopic image displayed on the display section 181 is represented as a viewing position 710.

For example, when a plane image displayed on the position 700 of the display face is viewed by the user, angle adjustment of the eyeballs of the user in the horizontal direction is carried out so that the angle may coincide with the position of the image noticed by the user and the focus of both eyes is adjusted to the position 700 of the display face. More particularly, the angle adjustment of both eyes of the user in the horizontal direction is carried out so that an intersecting point defined by straight lines interconnecting the irises of both eyes of the user, that is, the left eye 711 and the right eye 712, and the position 700 of the display face, in other words, a noticed point 701, coincides with the position of the image noticed by the user. Further, together with the angle adjustment, the focus of both eyes is adjusted to the position 700 of the display face, that is, to the noticed point 701. It is to be noted that the angle α1 at the noticed point 701 is normally called convergence angle. In the case where the user observes a plane image displayed on the position 700 of the display face in this manner, both of the focus and the eye point of both eyes, that is, the left eye 711 and the right eye 712, of the user exist at the position 700 of the display face.

Here, a calculation method for the convergence angle α1 is described. For example, the distance between the position 700 of the display face and the viewing position 710 is represented by L1, and the distance between both eyes of the user who is viewing a stereoscopic image is represented by e1. In this instance, the following expression 4 is satisfied.

$$\tan(\alpha 1/2)=(e1/2)/L1 \quad \text{expression 4}$$

Then, the convergence angle α1 can be determined from the following expression 5:

$$\alpha 1=2\tan^{-1}((e1/2)/L1) \quad \text{expression 5}$$

It is to be noted that, as the distance L1, the image pickup object distance outputted from the image pickup section 610 can be used. Or, as the distance L1, a fixed value determined assuming a viewing position such as 2 m may be used, or the distance L1 may be acquired by a manual operation by the user, that is, by a manual operation using the remote controller 500. Or else, the distance L1 may be acquired by distance measurement by a microphone for adjustment or by a distance measuring method using the remote controller 500. It is to be noted that, in the distance measuring method using the remote controller 500, for example, a UWB (Ultra Wide Band) is provided on the remote controller 500 which the user 10 holds by hand such that the distance L1 is measured using a position measuring function of the UWB. Or else, a distance measuring apparatus for measuring the distance using an infrared ray or an ultrasonic wave may be used to measure the distance L1.

FIG. 26B shows the eyeballs of the user in the case where the user views a stereoscopic image or 3D image and a corresponding convergence angle α2. It is to be noted that, in FIG. 26B, the position 700 of the display face and the viewing position 710 are similar to those in FIG. 26A. Further, the protruding position of a stereoscopic material body 720 included in the stereoscopic image is represented as a protruding position 721, and the distance or protruding amount between the position 700 of the display face and the protruding position 721 is represented by L2.

For example, when a stereoscopic image displayed at the position 700 of the display face is observed by the user, angle adjustment of the eyeballs of the user in the horizontal direction is carried out so as to be adjusted to the position of an image noticed by the user, that is, to the protruding position 721. In particular, angle adjustment of the eyeballs of the user in the horizontal direction is carried out so that an intersecting point defined by straight lines interconnecting the irises of both eyes, that is, the left eye 711 and the right eye 712, of the user and the protruding position 721, that is, a noticed point 722, may coincide with the position of the image noticed by the user, that is, of the image of the stereoscopic material body 720. It is to be noted that the convergence angle at the noticed point 722 is a2.

However, the focus of both eyes is adjusted to the position 700 of the display face. In particular, angle adjustment is carried out so that the angle coincides with the noticed point 722 and the focus of both eyes is adjusted to the position 700, that is, to the noticed point 701, of the display face.

In this manner, while both eyes are focused at the position 700 of the display face, since the noticed point 722 is positioned at the protruding position 721, a contradiction with a physiological phenomenon which can really occur occurs. Therefore, it is significant to prevent such a contradiction as just described from making a cause of fatigue of the user.

Here, a calculation method of the convergence angle α2 is described. For example, the distance between the position 700 of the display face and the protruding position 721 is represented by L2, and the distance between both eyes of the user whose is viewing the stereoscopic image by e2. In this instance, the following expression 6 is satisfied:

$$\tan(\alpha 2/2)=(e2/2)/(L1-L2) \quad \text{expression 6}$$

Then, the convergence angle α2 can be determined in accordance with the following expression 7:

$$\alpha 2=2\tan^{-1}((e2/2)/(L1-L2)) \quad \text{expression 7}$$

It is to be noted that, as the distance L2, the displacement amount of a material body in the stereoscopic image may be used to determine the protruding amount of the material body thereby to determine the distance L2.

It is to be noted that, while, in the present example, an image noticed by the user, that is, an image of the stereoscopic material body 720, is detected based on the distance between the irises of both eyes, that is, the left eye 711 and the right eye 712, of the user, some other detection method may be used. For example, an eye tracking or gaze analysis method may be used for the detection.

Example of Measurement of Reference Iris Information

FIGS. 27A and 27B schematically illustrate a measuring method when reference iris information retained in the reference iris information retention section 640 in the second embodiment of the disclosed technology is acquired and an example of the retained substance of the reference iris information retention section 640.

More particularly, FIG. 27A illustrates an example of a relationship among a stereoscopic image or 3D image displayed on the display section 181, the eyeballs of the user and the convergence angle α10 when reference iris information is measured. It is to be noted that, in FIG. 27A, the position 700 of the display face and the viewing position 710 are similar to those in FIG. 26A. Further, the protruding position of a reference stereoscopic material body 730 included in the stereoscopic image is represented as protruding position 731 and the distance between the position 700 of the display face and the protruding position 731, that is, the protruding amount, is represented by L3.

Here, the reference stereoscopic material body 730 is a material body included in a stereoscopic image or reference stereoscopic image displayed when reference iris information relating to the user is to be acquired. For example, if the reference iris information acquisition button 506 shown in FIG. 6 is depressed, then the control section 690 issues an instruction to the output controlling section 680 to display a stereoscopic image including the reference stereoscopic material body 730 on the display section 181. Consequently, a stereoscopic image including the reference stereoscopic material body 730 is displayed on the display section 181, and the user can observe the reference stereoscopic material body 730. It is to e noted that the stereoscopic image including the reference stereoscopic material body 730 may be stored in the content storage section 121 or may be retained in the output controlling section 680. It is to be noted that the convergence angle α10 can be determined using the expression 7 given hereinabove.

FIG. 27B schematically illustrates the retained substance of the reference iris information retention section 640. In the reference iris information retention section 640, left eye iris position information 641, right eye iris position information 642, both eyes iris distance information 643 and convergence angle information 644 are retained. The information retained in the reference iris information retention section 640 is information, or reference iris information, relating to the irises detected by the iris detection section 630 when a stereoscopic image including the reference stereoscopic material body 730 is displayed on the display section 181.

The left eye iris position information 641 represents the position of the iris of the left eye detected by the iris detection section 630 when a stereoscopic image including the reference stereoscopic material body 730 is displayed on the display section 181. In the left eye iris position information 641, for example, the center position (X1, Y1) of the iris of the left eye 711, for example, in the image data or image produced by the image pickup section 610 is stored.

The right eye iris position information 642 represents the position of the iris of the right eye detected by the iris detection section 630 when a stereoscopic image including the reference stereoscopic material body 730 is displayed on the display section 181. In the right eye iris position information 642, for example, the center position (X2, Y2) of the iris of the right eye 712, for example, in the image data or image produced by the image pickup section 610 is stored.

The both eyes iris distance information 643 is information representative of the distance between the irises of the left eye and the right eye detected by the iris detection section 630 when a stereoscopic image including the reference stereoscopic material body 730 is displayed on the display section 181. In the both eyes iris distance information 643, for example, the distance e3 between the left eye 711 and the right eye 712 in the image data or image produced by the image pickup section 610 is stored.

The convergence angle information 644 is information representative of the convergence angle relating to the left eye and the right eye detected by the iris detection section 630 when a stereoscopic image including the reference stereoscopic material body 730 is displayed on the display section 181. In the convergence angle information 644, for example, the convergence angle $\alpha 10$ relating to the left eye 711 and the right eye 712 in the image data or image produced by the image pickup section 610 is stored.

Example of Correction of the Protrusion Position

Figure 28:
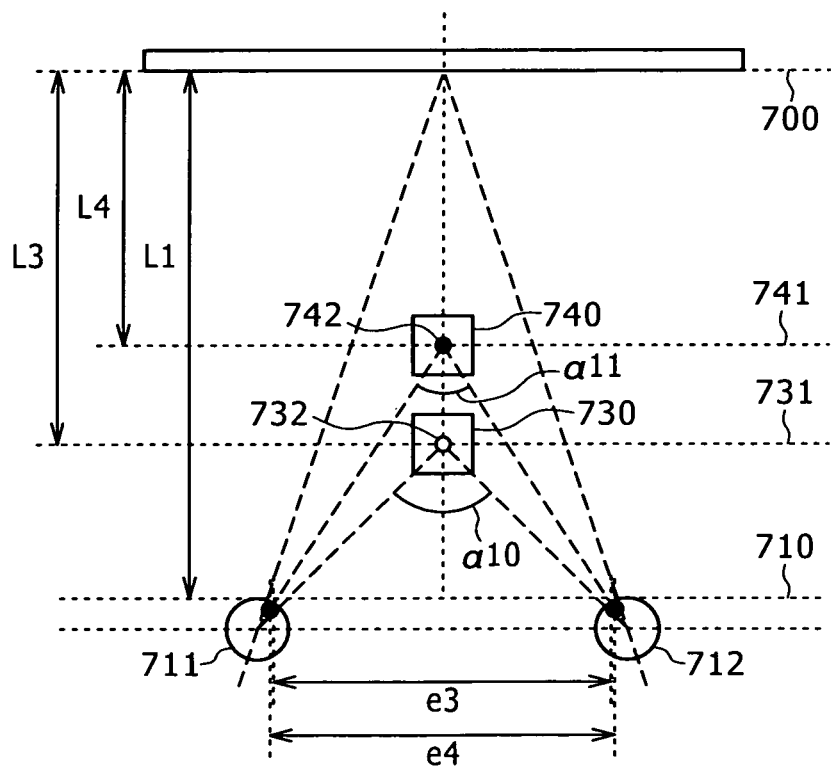
FIGS. 28 and 29 are diagrammatic views schematically illustrating different examples of correction of a protruding position of a stereoscopic material body included in a stereoscopic image displayed on the display section shown in FIG. 23.
Figure 29:
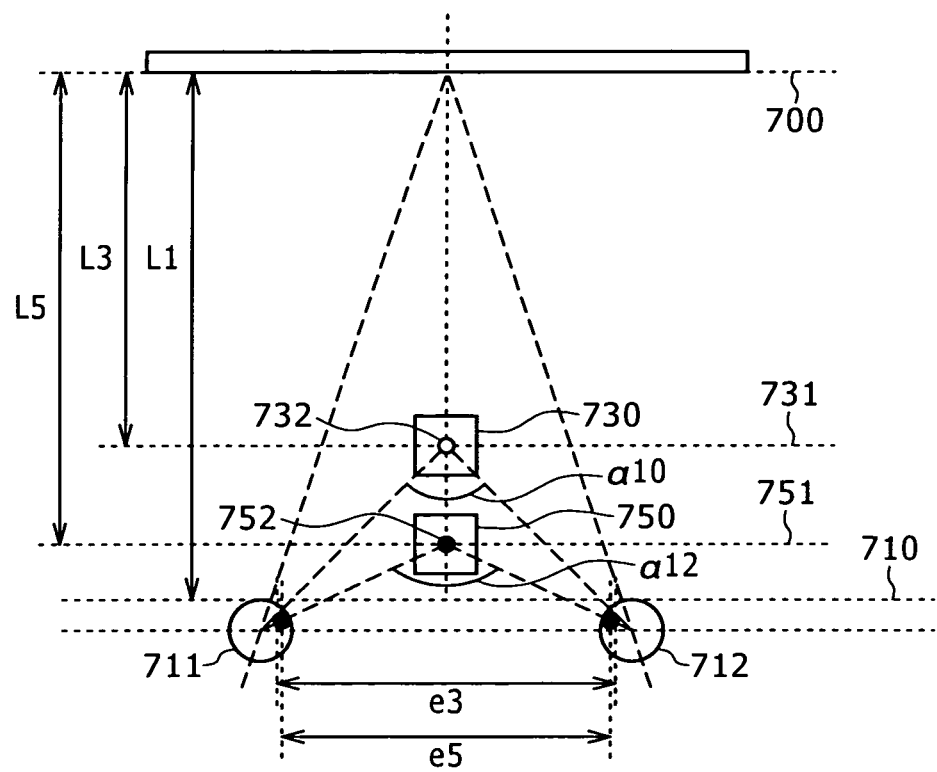

FIGS. 28 and 29 schematically illustrate an example of correction of the protruding position of a stereoscopic material body included in a stereoscopic image displayed on the display section 181 in the second embodiment of the disclosed technology.

In particular, FIG. 28 illustrates an example of a relationship among a stereoscopic image or 3D image displayed on the display section 181, the eyeballs of the user and the convergence angles $\alpha 10$ and $\alpha 11$. It is to be noted that FIG. 28 is similar to FIG. 27A except for information relating to a stereoscopic material body 740. Further, the protruding position of the stereoscopic material body 740 included in the stereoscopic image is represented as a protruding position 741, and the distance between the position 700 of the display face and the protruding position 741, that is, the protruding amount, is represented by L4. Further, the convergence angle $\alpha 11$ can be determined using the expression 7 given hereinabove.

Here, the eyeball variation detection section 650 calculates the convergence angle $\alpha 11$ based on the iris information detected by the iris detection section 630, that is, based on the iris information relating to the left eye 711 and the right eye 712. Then, the eyeball variation detection section 650 calculates a difference between the reference convergence angle $\alpha 10$ retained in the convergence angle information 644 of the reference iris information retention section 640 and the convergence angle $\alpha 11$. Then, the determination block 671 of the stereoscopic image correction section 670 determines based on the difference value $\alpha 10 - \alpha 11$ whether or not the depthwise amount of the stereoscopic material body 740 is to be adjusted. In particular, if the difference value $\alpha 10 - \alpha 11$ is 0 or a positive value, that is, if $\alpha 10 \geq \alpha 11$, then the determination block 671 determines that adjustment of the depthwise amount of the stereoscopic material body 740 is not required. On the other hand, if the difference value $\alpha 10 - \alpha 11$ exhibits a negative value, that is, if $\alpha 10 < \alpha 11$, then the determination block 671 determines that adjustment of the depthwise amount of the stereoscopic material body 740 is required.

In the example illustrated in FIG. 28, since the reference convergence angle $\alpha 10$ is greater than the convergence angle $\alpha 11$, that is, since $\alpha 10 \geq \alpha 11$, the determination block 671 determines that adjustment of the depthwise amount of the stereoscopic material body 740 is not required. In other words, if the stereoscopic image including the stereoscopic material body 740 is displayed on the display section 181 as seen in FIG. 28, then correction of the stereoscopic image is not carried out.

FIG. 29 illustrates an example of a relationship among a stereoscopic image or 3D image displayed on the display section 181, the eyeballs of the user and the convergence angles $\alpha 10$ and $\alpha 12$. It is to be noted that FIG. 29 is similar to FIG. 27A except for information relating to a stereoscopic material body 750. Further, the protruding position of the stereoscopic material body 750 included in the stereoscopic image is represented as protruding position 751, and the distance between the position 700 of the display face and the protruding position 751, that is, the protruding amount, is represented by L5. The convergence angle $\alpha 12$ can be determined using the expression 7 given hereinabove.

Here, similarly as in the case illustrated in FIG. 28, the eyeball variation detection section 650 calculates the convergence angle $\alpha 12$ and then calculates a difference value between the reference convergence angle $\alpha 10$ and the convergence angle $\alpha 12$. Then, the determination block 671 of the stereoscopic image correction section 670 determines based on the difference value $\alpha 10 - \alpha 12$ whether or not the depthwise amount of the stereoscopic material body 750 is to be adjusted.

In the example illustrated in FIG. 29, since the reference convergence angle $\alpha 10$ is smaller than the convergence angle $\alpha 12$, that is, since $\alpha 10 < \alpha 11$, the determination block 671 determines that adjustment of the depthwise amount of the stereoscopic material body 750 is required. In this instance, the adjustment block 672 adjusts the depthwise amount of the stereoscopic material body 750 based on the difference value between the reference convergence angle $\alpha 10$ and the convergence angle $\alpha 12$ so that the convergence angle $\alpha 12$ may be within the reference convergence angle $\alpha 10$. By this adjustment, the position of the stereoscopic material body 750, that is, the protruding position 751, comes to a position same as the position of the reference stereoscopic material body 730, that is, the protruding position 731 or a position nearer to the position 700 side of display face than the protruding position 731.

It is to be noted that, while, in the example described above, the eyeball variation detection section 650 calculates the convergence angle, the determination block 671 may otherwise calculate the convergence angle and carry out a determination. In particular, the determination block 671 calculates the reference convergence angle $\alpha 10$ of the user 10 corresponding to the reference stereoscopic material body 730 and calculates the convergence angle $\alpha 12$ of the user 10 corresponding to the stereoscopic material body 750 included in the stereoscopic image displayed on the display section 181. Then, the stereoscopic image correction section 670 corrects the position of the stereoscopic material body 750 in the depthwise direction based on a result of the comparison between the convergence angle $\alpha 12$ and the reference convergence angle $\alpha 10$.

Further, while, in the example described above, convergence angles are compared with each other to determine whether or not correction is required. However, iris distances may be compared with each other to determine whether or not correction is required.

Example of Operation of the Information Processing Apparatus

Now, operation of the information processing apparatus 600 according to the second embodiment of the disclosed technology is described with reference to the drawings.

Figure 30:
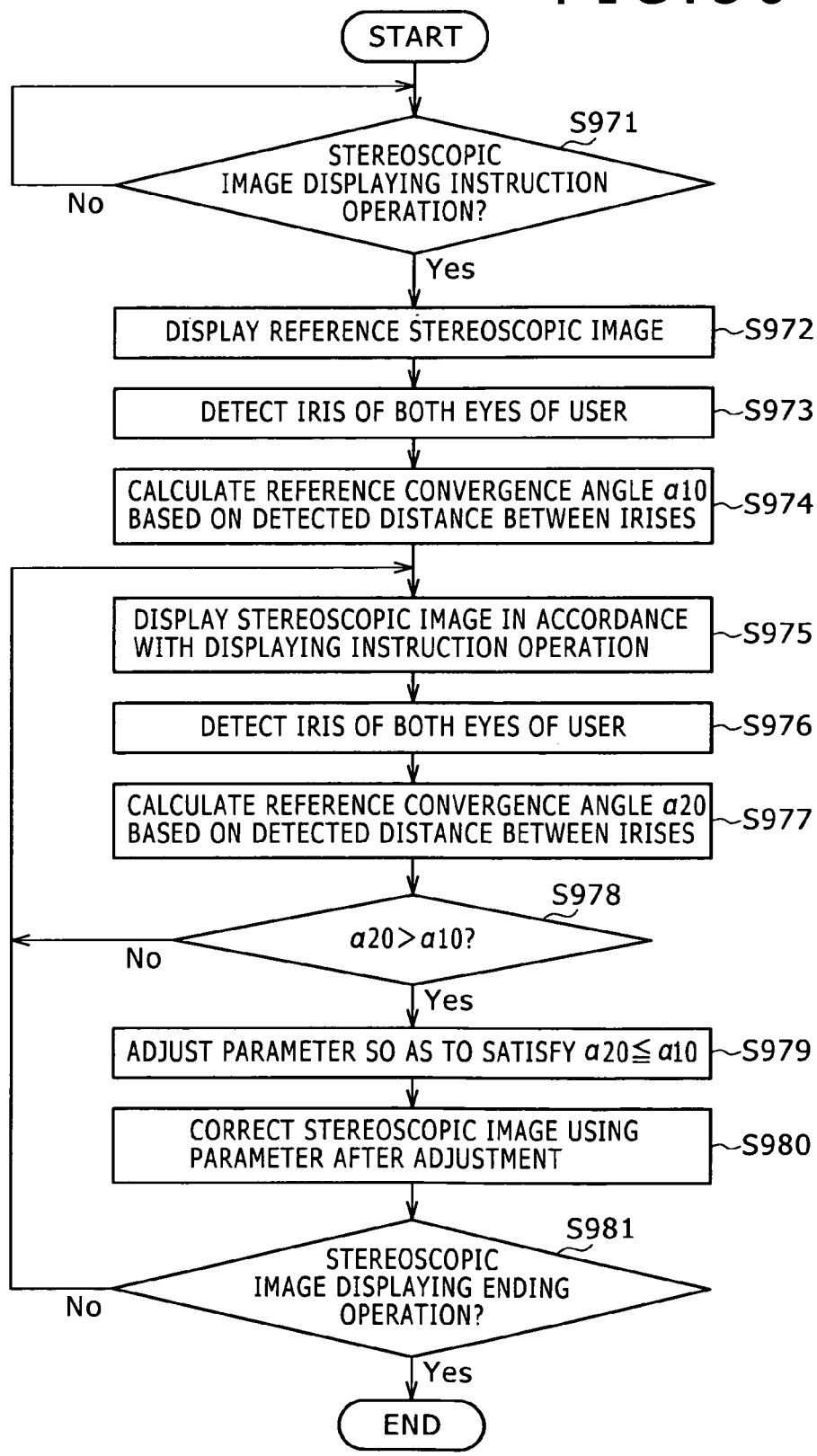
FIG. 30 is a flow chart illustrating an example of a processing procedure of a stereoscopic image displaying process by the information processing apparatus of FIG. 23.

FIG. 30 illustrates an example of a processing procedure of a stereoscopic image displaying process by the information processing apparatus 600 in the second embodiment of the disclosed technology. In FIG. 30, convergence angles are compared with each other to determine whether or not correction is required.

Referring to FIG. 30, it is decided first at step S971 whether or not a displaying instruction operation of a stereoscopic image is carried out, and if a displaying instruction operation of a stereoscopic image is not carried out, then the supervision is carried out continuously. On the other hand, if a displaying instruction operation of a stereoscopic image is carried out at step S971, then the output controlling section 680 controls the display section 181 to display a reference stereoscopic image under control of the control section 690 at step S972.

Then at step S973, the iris detection section 630 detects the irises of both eyes of the user included in the image or image data produced by the image pickup section 610. Then at step S974, the eyeball variation detection section 650 calculates the reference convergence angle α10 based on the distance between the detected irises, that is, based on the reference iris distance.

Then at step S975, the control section 690 outputs a stereoscopic image content relating to the displaying instruction operation. In particular, the output controlling section 680 controls the display section 181 to display a stereoscopic image according to the displaying instruction operation and controls the display section 181 to display the stereoscopic image content according to the displaying instruction operation at step S975. It is to be noted that, step S975 is an example of display controlling in the disclosed technique.

Then at step S976, the iris detection section 630 detects the irises of both eyes of the user included in the image or image data produced by the image pickup section 610. Then at step S977, the eyeball variation detection section 650 calculates the convergence angle α20 based on the distance between the detected irises. It is to be noted that, step S976 and S977 are examples of detecting in the disclosed technique.

Then at step S978, the determination block 671 carries out comparison between the reference convergence angle α10 and the convergence angle α20, that is, a determination of α10−α20<0, based on the difference value. If a result of the comparison indicates that the convergence angle α20 is equal to or smaller than the reference convergence angle α10 at step S978, then the processing returns to step S975. On the other hand, if the convergence angle α20 is greater than the reference convergence angle α10 at step S978, then the adjustment block 672 adjusts the parameter of the stereoscopic material body, that is, the displacement amount, at step S979. In particular, the adjustment block 672 adjusts the parameter of the stereoscopic material body based on the difference value between the reference convergence angle α10 and the convergence angle α20 so that the convergence angle α20 may be within the reference convergence angle α10 at step S979. Then, the stereoscopic image correction section 670 carries out correction of the stereoscopic image using the parameter or displacement amount after the adjustment at step S980. Then, the stereoscopic image after the correction is successively displayed. It is to be noted that, step S978 to S980 are examples of correcting in the disclosed technique.

Thereafter, it is decided at step S981 whether or not a displaying ending operation of a stereoscopic image is carried out. If a displaying ending operation of a stereoscopic image is not carried out, then the processing returns to step S975. On the other hand, if a displaying ending operation of a stereoscopic image is carried out at step S981, then the operation of the stereoscopic image displaying process is ended.

In this manner, in the second embodiment of the disclosed technology, when the user observes a stereoscopic image, the fatigue of the eyes can be reduced without losing the presence.

It is to be noted that, while, in the description of the second embodiment of the disclosed technology, description of correction of sound is omitted, upon correction of a stereoscopic image described above, sound may be corrected using the parameter used for the correction.

It is to be noted that, in the foregoing description of the embodiments of the disclosed technology, an information processing apparatus is described wherein a stereoscopic image content corresponding to a broadcasting wave is acquired to display a stereoscopic image. However, the embodiments of the disclosed technology can be applied also to an information processing apparatus wherein a stereoscopic image content stored in a recording medium is acquired to display a stereoscopic image. The embodiments of the disclosed technology can be applied also to an information processing apparatus wherein a stereoscopic image content is acquired through a network which may be a wire network or a wireless network to display a stereoscopic image.

It is to be noted that any of the processing procedures described in connection with the preferred embodiments of the disclosed technology may be grasped as a method which includes the processing procedure or as a program for causing a computer to execute the processing procedure or else as a recording medium on or in which the program is stored. The recording medium may be, for example, a CD (Compact Disc), an MD (MiniDisc), a DVD (Digital Versatile Disk), a memory card, a Blu-ray disk (registered trademark) or the like.

The present disclosure contains subject matter related to that disclosed in Japanese Priority Patent Application JP 2010-264892 filed in the Japan Patent Office on Nov. 29, 2010, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. An information processing apparatus, comprising:
a computing device operable to:
control a display section to display a stereoscopic content based on stereoscopic image information;
detect a first difference value between a predetermined convergence angle corresponding to a predetermined distance between eyeballs of a user and a first convergence angle corresponding to a first distance between the eyeballs of the user when the stereoscopic content is displayed on the display section, wherein the first distance is different from the predetermined distance;

correct position of a material body included in the stereoscopic content in the depthwise direction based on the first difference value, wherein when the first convergence angle is greater than the predetermined convergence angle, the position of the material body included in the stereoscopic content in the depthwise direction is moved towards the display section, wherein the first convergence angle and the predetermined convergence angle are calculated for a same distance between a position of the display section and a viewing position of the user, and wherein the correction is performed by adjusting a displacement amount of the position of the material body in a displacement amount retention table; and multiply the displacement amount by a parameter that varies in accordance with a speed of reproduction of the stereoscopic content.

2. The information processing apparatus according to claim 1, wherein the computing device is further operable to:

detect iris of each of the eyeballs of the user when the stereoscopic content is displayed on the display section, wherein the predetermined distance and the first distance is measured between the centers of detected irises.

3. The information processing apparatus according to claim 2, wherein said computing device is further operable to determine the predetermined distance between the irises detected at a predetermined timing as a reference iris distance and successively compare the predetermined distance with distances between the irises detected later than the predetermined timing to detect the first difference value.

4. The information processing apparatus according to claim 3, wherein the predetermined timing is a timing at which an instruction operation for the instruction to display the stereoscopic content based on the stereoscopic image information is carried out.

5. The information processing apparatus according to claim 4, wherein said computing device is further operable to control, when the instruction operation is carried out, the display section to display a reference stereoscopic content including a reference material body for measuring the reference iris distance, and determine distance between the irises of the user when the reference stereoscopic content is displayed on the display section.

6. The information processing apparatus according to claim 1, wherein the stereoscopic image information comprises a parameter indicative of position of the material body included in the stereoscopic content in the depthwise direction, and said computing device is operable to carry out the correction by adjusting the parameter.

7. The information processing apparatus according to claim 1, wherein said computing device is operable to carry out the correction such that, when a second difference value between the first distance and the predetermined distance is greater than a fixed reference amount, the position of the material body included in the stereoscopic content in the depthwise direction is moved towards the display section.

8. An information processing apparatus, comprising:
a computing device operable to:
accept an instruction operation to carry out multiple speed reproduction of a stereoscopic content;
correct, when the instruction operation is accepted, depthwise amount of a material body included in the stereoscopic content by multiplying the depthwise amount of the material body with a parameter, wherein value of the parameter inversely varies with multiple speed reproduction of the stereoscopic content; and
output the stereoscopic content in which the depthwise amount of the material body is corrected.

9. A non-transitory computer readable storage medium having stored thereon, a computer program having at least one code section executable by a computer, thereby causing the computer to perform the steps comprising:

controlling a display section to display a stereoscopic content based on stereoscopic image information;

detecting a difference value between a predetermined convergence angle corresponding to a predetermined distance between a first eyeball and a second eyeball of a user and a first convergence angle corresponding to a first distance between the first eyeball and the second eyeball of the user when the stereoscopic content is displayed on the display section, wherein the first distance is different from the predetermined distance;

correcting position of a material body included in the stereoscopic content in the depthwise direction based on the difference value, wherein when the first convergence angle is greater than the predetermined convergence angle, the position of the material body included in the stereoscopic content in the depthwise direction is moved towards the display section, wherein the first convergence angle and the predetermined convergence angle are calculated for a same distance between a position of the display section and a viewing position of the user, and wherein the correction is performed by adjusting a displacement amount of the position of the material body in a displacement amount retention table; and multiplying the displacement amount by a parameter that varies in accordance with a speed of reproduction of the stereoscopic content.

10. An information processing method, comprising:
controlling a display section to display a stereoscopic content based on stereoscopic image information;

detecting a difference value between a predetermined convergence angle corresponding to a predetermined distance between a first eyeball and a second eyeball of a user and a first convergence angle corresponding to a first distance between the first eyeball and the second eyeball of the user when the stereoscopic content is displayed on the display section, wherein the first distance is different from the predetermined distance;

correcting position of a material body included in the stereoscopic content in the depthwise direction based on the difference value, wherein when the first convergence angle is greater than the predetermined convergence angle, the position of the material body included in the stereoscopic content in the depthwise direction is moved towards the display section, wherein the first convergence angle and the predetermined convergence angle are calculated for a same distance between a position of the display section and a viewing position of the user, and wherein the correction is performed by adjusting a displacement amount of the position of the material body in a displacement amount retention table; and multiplying the displacement amount by a parameter that varies in accordance with a speed of reproduction of the stereoscopic content.

11. The information processing method according to claim 10, wherein a convergence angle is the angle of intersection of a first straight line interconnecting the first eyeball of the user to the material body included in the stereoscopic content and a second straight line interconnecting the second eyeball of the user to the material body included in the stereoscopic content.

12. The information processing method according to claim 10, wherein the predetermined distance between the first eyeball and the second eyeball of the user is determined at a predetermined tuning as a reference distance between the first eyeball and the second eyeball.

13. The information processing method according to claim 12, wherein the predetermined timing is a timing at which an instruction operation for the instruction to display the stereoscopic content based on the stereoscopic image information is carried out.

14. The information processing method according to claim 10, further comprising:
   detecting iris of each of the first eyeball and the second eyeball of the user when the stereoscopic content is displayed on the display section.

15. The information processing method according to claim 14, wherein the irises of the first eyeball and the second eyeball are detected based on matching between an actual image of the user and a template comprising luminance distribution information associated with the irises.

16. The information processing method according to claim 14, wherein the irises are detected based on tracking movement of the first eyeball and the second eyeball.

17. The information processing method according to claim 10, wherein the predetermined distance and the first distance is measured between centers of irises of the first eyeball and the second eyeball of the user.

* * * * *